US007739227B2

(12) United States Patent
Jordan et al.

(10) Patent No.: US 7,739,227 B2

(45) Date of Patent: Jun. 15, 2010

(54) ENTERPRISE CONFIDENTIAL ELECTRONIC DATA INVENTORY SYSTEMS, METHODS AND COMPUTER PROGRAM PRODUCTS

(75) Inventors: Glenda S. Jordan, Lawrenceville, GA (US); Jeanne M. Robinson, Smyrna, GA (US); Ryan D. Fisher, Calera, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 337 days.

(21) Appl. No.: 11/786,681

(22) Filed: Apr. 12, 2007

(65) Prior Publication Data

US 2008/0215622 A1 Sep. 4, 2008

Related U.S. Application Data

(60) Provisional application No. 60/892,338, filed on Mar. 1, 2007.

(51) Int. Cl.
*G06F 7/00* (2006.01)

(52) U.S. Cl. ....................... 707/600; 707/602; 707/912; 707/944; 707/949

(58) Field of Classification Search ................ 707/600, 707/602, 912, 944, 949
See application file for complete search history.

(56) References Cited

U.S. PATENT DOCUMENTS

| | | | | |
|---|---|---|---|---|
| 5,355,412 | A * | 10/1994 | Kangas | 713/161 |
| 6,324,646 | B1 * | 11/2001 | Chen et al. | 726/6 |
| 7,287,692 | B1 * | 10/2007 | Patel et al. | 235/380 |
| 7,451,481 | B2 * | 11/2008 | Bauer et al. | 726/3 |

* cited by examiner

*Primary Examiner*—John R. Cottingham
*Assistant Examiner*—Noosha Arjomandi
(74) *Attorney, Agent, or Firm*—Myers Bigel Sibley & Sajovec

(57) ABSTRACT

Enterprise confidential electronic data inventory systems, methods and/or computer program products include a database management system, method and/or computer program product that is configured to store identifying information for the confidential electronic data of the enterprise without storing the confidential electronic data itself. Querying of the identifying information for the electronic data of the enterprise that is stored may also be provided.

14 Claims, 42 Drawing Sheets

ENTERPRISE CONFIDENTIAL ELECTRONIC DATA INVENTORY SYSTEMS, METHODS AND COMPUTER PROGRAM PRODUCTS

CROSS REFERENCE TO RELATED APPLICATION

This invention claims the benefit of and priority to provisional Application Ser. No. 60/892,338, filed Mar. 1, 2007, entitled Data Sensitivity Classification Inventory Systems, Methods and Computer Program Products, assigned to the assignee of the present application, the disclosure of which is hereby incorporated herein by reference in its entirety as if set forth fully herein.

FIELD OF THE INVENTION

This invention relates to data processing systems, methods and computer program products, and more particularly to database management systems, methods and computer program products.

BACKGROUND OF THE INVENTION

An enterprise, such as a company or business, may have a large volume of widely dispersed confidential information. Some of this confidential information may be in printed form and may be safeguarded by labeling the printed material as confidential, and/or by providing rules for access to and storage of this printed confidential information. However, other enterprise confidential data may be stored in electronic form on widely dispersed computer systems. This widely dispersed enterprise confidential electronic data may be difficult to manage. Unfortunately, increasing concerns over the loss of sensitive electronic data in an enterprise, such as data that can be used for identity theft, may heighten the desire to effectively manage enterprise confidential electronic data.

SUMMARY OF THE INVENTION

Some embodiments of the present invention provide enterprise confidential electronic data inventory systems, methods and/or computer program products that include a database management system, method and/or computer program product that is configured to store identifying information for the confidential electronic data of the enterprise without storing the confidential electronic data itself. Querying of the identifying information for the electronic data of the enterprise that is stored may also be provided.

In some embodiments, the identifying information for the confidential electronic data of the enterprise comprises an identification of an electronic location of the confidential electronic data and an identification of a data type of the confidential electronic data. Examples of a data type may include a Social Security number, stored password or salary information. In other embodiments, the identifying information may further comprise an indication of a quantity of the confidential electronic data, for example how many Social Security numbers are electronically stored at the identified electronic location. In still other embodiments, the identifying information further comprises an identification of a contact person for the confidential electronic data. In still other embodiments, the identifying information further comprises an indication of safeguards that are in place for the confidential electronic data. The safeguards may include password protection, encryption etc. In yet other embodiments, the identifying information further comprises an indication of a system type for the electronic location of the confidential electronic data. System types may include a mainframe computer, a desktop computer, etc. In yet other embodiments, the identifying information further comprises an indication of a confidentiality classification level (e.g., confidential, restricted confidential) of the confidential electronic data. The confidential electronic data itself may comprise identity theft enabling data, enterprise employee data, enterprise customer data, enterprise strategic data and enterprise legal data.

In other embodiments of the present invention, an enterprise network is also provided that is connected to the database management system, and a plurality of enterprise client devices are connected to the enterprise network. The enterprise client devices are configured to accept input of the identifying information for the confidential electronic data of the enterprise without accepting input of the confidential electronic data itself, and to transmit the identifying information for the confidential electronic data of the enterprise to the database management system via the enterprise network. Alternatively, or in addition, the enterprise client devices may be configured to accept queries of the database management system, to transmit the queries to the database management system via the enterprise network and to receive query results from the database management system via the enterprise network. The database management system itself may be configured to store identifying information for the confidential electronic data of the enterprise that is received from the enterprise network without storing the confidential electronic data itself, to receive queries of the database management system from the enterprise network and to transmit query results from the database management system via the enterprise network.

Embodiments of the invention have been described above primarily in connection with database management systems that can be used to provide enterprise confidential electronic data inventory systems, according to various embodiments of the present invention. However, analogous enterprise confidential electronic data inventory methods and analogous enterprise confidential electronic data inventory computer program products also may be provided according to other embodiments of the present invention.

Other systems, methods, and/or computer program products according to other embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
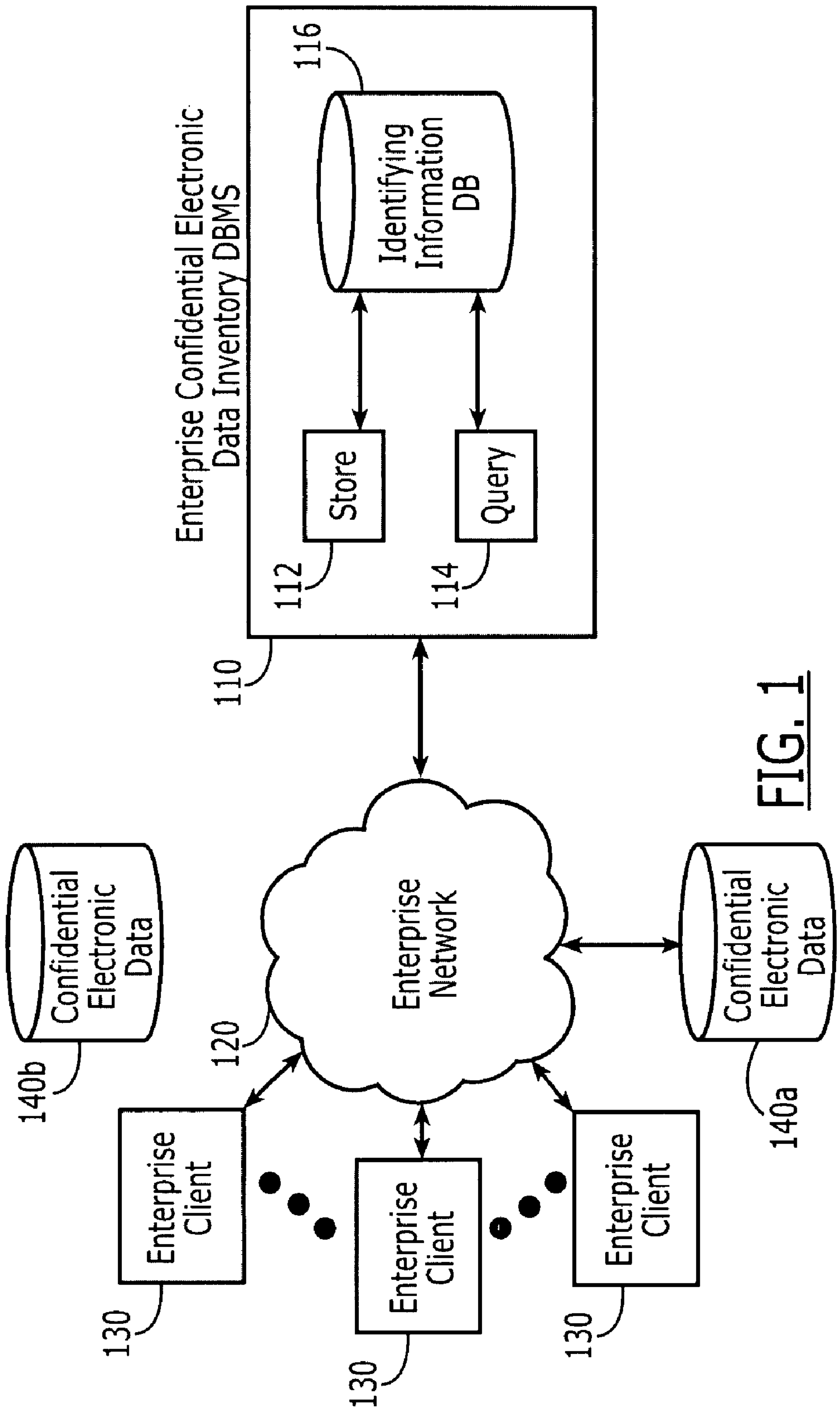
FIG. 1 is a block diagram of enterprise confidential electronic data inventory systems, methods and computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of enterprise confidential electronic data inventory systems, methods and computer program products according to various embodiments of the present invention. As shown in FIG. 1, these systems, methods and/or computer program products may include an enterprise confidential electronic data inventory database management system (DBMS) 110 that is configured to store identifying information for the confidential electronic data 140*a*, 140*b* of the enterprise, for example in an identifying information database (DB) 116, without storing the confidential electronic data 140*a*, 140*b* itself. A data storing system, method and/or computer program product 112 may be provided to store the identifying information for the confidential electronic data 140*a*, 140*b* in the identifying information database 116. A query system, method and/or computer program product 114 can provide querying the identifying information for the confidential electronic data 140*a*, 140*b* of the enterprise that is stored in the identifying information database 116.

As is well known to those having skill in the art, a DBMS is a complex set of software programs that controls the organization, storage and retrieval of data in a database. A DBMS may include a modeling language to define the schema of a database hosted in the DBMS, data structures, a database query language and report writer to allow users to interactively interrogate (query) the database, and a transaction mechanism that allows data to be input (stored) into the database. The design and operation of DBMS are well known to those having skill in the art, and need not be described further herein. Some embodiments of the present invention can use the well-known Oracle DBMS. However, other DBMS may be used.

Figure 4:
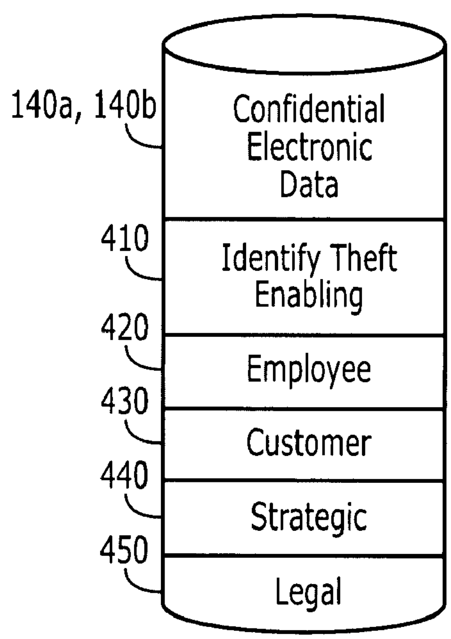
FIG. 4 schematically illustrates confidential electronic data according to various embodiments of the present invention.

Still referring to FIG. 1, the enterprise confidential electronic data inventory DBMS 110 may be connected to a plurality of enterprise client devices 130 via an enterprise network 120. The enterprise network 120 may include a wired and/or wireless local and/or wide area network including a virtual private network, and may at least partially employ the Internet. The enterprise client devices 130 may be any enterprise, application, personal and/or pervasive computer device that is configured to connect to the enterprise network 120 wirelessly or via wireline connection, and which may include, for example, a Web browser. The confidential electronic data of the enterprise may be stored on any enterprise, application, personal and/or pervasive computing device throughout the enterprise, and may be connected to the enterprise network as shown at 140*a*, or may be in a standalone system as shown at 140*b*. As illustrated conceptually in FIG. 4, the confidential electronic data 140*a*, 140*b* may include identity theft enabling data 410, enterprise employee data 420, enterprise customer data 430, enterprise strategic data 440 and enterprise legal data 450. Many specific examples will be provided below.

Figure 2:
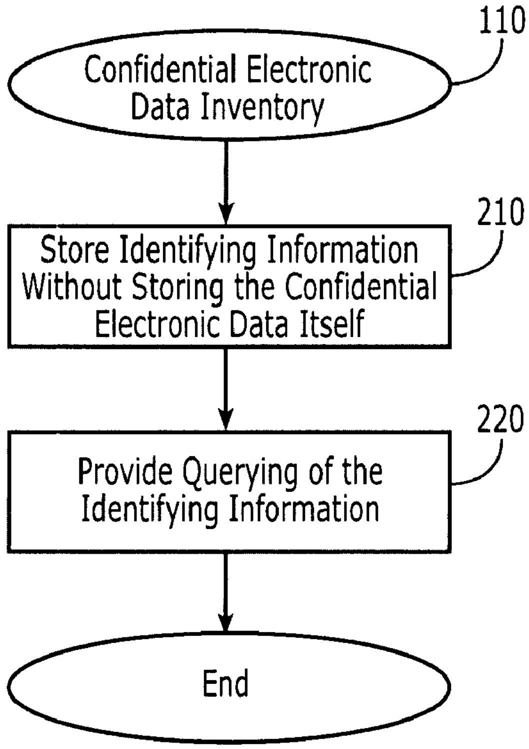
FIG. 2 is a flowchart of operations that may be performed to provide enterprise confidential electronic data inventory according to various embodiments of the present invention.

FIG. 2 is a flowchart of operations that may be performed to provide an enterprise confidential electronic data inventory according to various embodiments of the present invention. These operations may be performed by the enterprise confidential electronic data inventory DBMS 110 of FIG. 1.

Specifically, as shown in FIG. 2, identifying information for the confidential electronic data of the enterprise is stored, for example using the storing Block 210 and the identifying information database 116 of FIG. 1, without storing the confidential electronic data 140*a*, 140*b* itself. Moreover, at Block 220, querying of the identifying information for the confidential electronic data of the enterprise that is stored is also provided, for example, by the query block 114 and the identifying information database 116 of FIG. 1.

Figure 3:
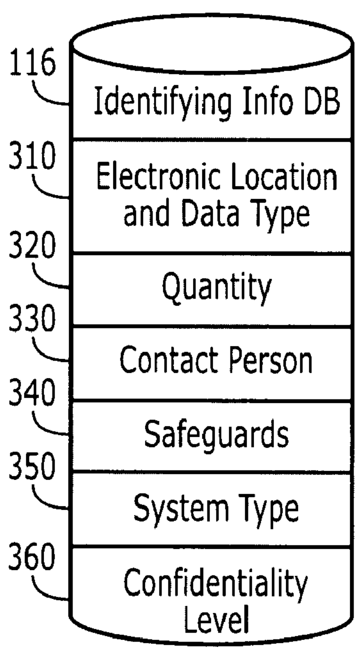
FIG. 3 conceptually indicates an identifying information database according to various embodiments of the present invention.

For example, as shown in the conceptual block diagram of FIG. 3, the identifying information for the confidential electronic data of the enterprise may comprise identification of an electronic location of the confidential electronic data, and an identification of a data type of the confidential electronic data 310. An example of an electronic location may be a network address of the system that stores the confidential electronic data, and an example of an identification of the data type may be a Social Security number. In other embodiments, the identifying information for the confidential electronic data of the enterprise may further comprise an indication of a quantity 320 of the confidential electronic data, such as the number of Social Security numbers that are stored in a given system. By providing an indication of quantity, the relative importance of safeguarding a given system may be ascertained.

Still referring to FIG. 3, the identifying information for the confidential electronic data of the enterprise may further comprise an identification of a contact person 330 for the confidential electronic data. The identification information may further comprise an indication of safeguards 340 that are in place for the confidential electronic data. These indications may comprise an indication that the data is password protected, encrypted, etc. This safeguard indication 340 may provide an indication of the sensitivity of the electronic data to theft.

Still referring to FIG. 3, the identifying information for the confidential electronic data of the enterprise may further comprise an indication of a system type 350 for the electronic location of the confidential electronic data. An example of a system type may be a personal computer or a mainframe system. The indication of system type may provide further opportunity to identify the susceptibility of the data to theft.

According to yet other embodiments, the identifying information may include an indication of the confidentiality classification level 360 of the confidential electronic data. For example, as is well known, an enterprise may classify its data as internal use only, confidential, restricted and/or using other classification levels. A knowledge of the confidentiality classification level 360 may also provide an indication of the sensitivity of the confidential electronic data in the enterprise.

FIG. 3 provided six examples of identifying information for the confidential electronic data of the enterprise according to various embodiments of the invention. These examples will be described in more detail below, and many other examples of identifying information for the confidential electronic data of the enterprise will also be provided.

Additional discussion of various embodiments of the present invention will now be provided. In particular, due to heightened concerns over the loss of highly sensitive data in an enterprise (company or business), such as information that can be used for identity theft, an up-to-date inventory of electronically stored, highly sensitive data is desirable. Embodiments of the invention can document the information sources that contain highly sensitive data and collect pertinent information concerning these information sources, such as existing security safeguards, without collecting the information itself. Analysis of the adequacy of controls is then possible once the data has been collected. The volume of data generally is too cumbersome to manage manually.

More specifically, a data classification scheme for electronic information may be desirable, in order to identify which electronic information sources should have more security controls in place (e.g., information classified as highly confidential should have stronger controls than publicly available information). A barrage of media coverage has concerned the breach of sensitive information, such as identify theft-enabling information or customer call details. Embodiments of the invention can provide systems, methods and/or computer program products to collect information about the electronic sources deemed to be highly confidential or restricted based on inclusion of certain highly sensitive data elements. By using embodiments of the invention, data can be analyzed and recommendations can be made to enhance controls to help prevent the inadvertent or intentional unauthorized disclosure of highly sensitive information. Embodiments of the invention can allow a proactive approach to managing highly sensitive data, as opposed to a reactive measure after a breach occurs.

Embodiments of the invention can be used to enter information by electronic information sources that contain highly sensitive data elements. Such information may include the name of the information source and whether it is a database, server or mainframe-based file, or a personal application file. Embodiments of the invention can collect data such as the highly sensitive data elements existing and the number of occurrences of each, security safeguards currently in place, transmission activity, records retention, and more specific information relative to the type of information source. After entering the information, a data sensitivity classification team can perform an analysis of the data to determine if existing controls appear adequate to properly protect the information from a breach. For high volume of information sources, the team can group the information into manageable segments. Some embodiments may also provide utilities that can aid in searching for specific attributes, grouping, summarizing, and/or downloading data which presents the data at the appropriate level for the analysis phase. Embodiments of the invention may provide an ongoing inventory repository rather than being used for a one-time effort.

Accordingly, some embodiments of the invention can allow the data to be maintained in a central database. Before this data collection effort, the extent of highly sensitive data that existed throughout a company may not be readily known. It could not be readily said, for example, "Here are all the places we maintain customer credit card numbers." By having the information collected and centralized, it can be appropriately analyzed for risk. Embodiments of the invention can allow for data to be sliced and diced numerous ways so that appropriate analyses and recommendations can be made.

A database schema for the identifying information database 116 of FIG. 1, according to some embodiments of the present invention, is provided in Table 1.

TABLE 1

| DC_BUSINESS_UNIT | |
|---|---|
| UNIQUEID | NUMBER(10) |
| DESCRIPTION | VARCHAR2(50) |
| DELETED | NUMBER(1) |
| RANK | NUMBER(10) |
| **DC_CONTACT_INFO** | |
| UNIQUEID | NUMBER(10) |
| TITLE | VARCHAR2(50) |
| UID | CHAR(7) |
| PHONE | CHAR(10) |
| EMAIL | VARCHAR2(50) |
| IPAGER | VARCHAR2(50) |
| FIRST_NAME | VARCHAR2(25) |
| LAST_NAME | VARCHAR2(25) |
| **DC_CONTROL_EXPLANATION** | |
| UNIQUEID | NUMBER(10) |
| DATA_SOURCE_ID | NUMBER(10) |
| CONTROL_FLAG | NUMBER(10) |
| EXPLANATION | VARCHAR2(50) |
| **DC_CORE_APPLICATION** | |
| UNIQUEID | NUMBER(10) |
| DESCRIPTION | VARCHAR2(50) |
| DELETED | NUMBER(10) |
| RANK | NUMBER(10) |
| OTHER_FLAG | NUMBER(1) |
| **DC_DATA_CATEGORY** | |
| UNIQUEID | NUMBER(10) |
| DESCRIPTION | VARCHAR2(50) |
| HELP_DESCRIPTION | VARCHAR2(500) |
| DELETED | NUMBER(1) |
| RANK | NUMBER(10) |
| **DC_DATA_ELEMENT** | |
| UNIQUEID | NUMBER(10) |
| DESCRIPTION | VARCHAR2(100) |
| HELP_DESCRIPTION | VARCHAR2(500) |
| OTHER_FLAG | NUMBER(1) |
| DELETED | NUMBER(1) |
| RANK | NUMBER(10) |
| RISK_FACTOR_ID | NUMBER(10) |
| **DC_DATA_ELEMENT_CONTROL** | |
| UNIQUEID | NUMBER(10) |
| DESCRIPTION | VARCHAR2(150) |
| FLAG_BIT | NUMBER(10) |
| OTHER_FLAG | NUMBER(1) |
| DELETED | NUMBER(1) |
| RANK | NUMBER(10) |
| ENCRYPTED | NUMBER(1) |
| CONTROL_TYPE | NUMBER(10) |

TABLE 1-continued

| DC_DATA_ELEMENT_INVENTORY_DATA | |
|---|---|
| UNIQUEID | NUMBER(10) |
| RISK_FACTOR_ID | NUMBER(10) |
| HIGH_COUNT | NUMBER(20) |
| LOW_COUNT | NUMBER(20) |
| HIGH_POINT | NUMBER(10) |
| MID_POINT | NUMBER(10) |
| LOW_POINT | NUMBER(10) |
| ALL_OTHERS | NUMBER(1) |
| **DC_DATA_SOURCE** | |
| UNIQUEID | NUMBER(10) |
| SOURCE_TYPE_ID | NUMBER(10) |
| SOURCE_TYPE_OTHER_DESC | VARCHAR2(50) |
| PLATFORM_ID | NUMBER(10) |
| PLATFORM_OTHER_DESC | VARCHAR2(50) |
| APPLICATION_NAME | VARCHAR2(30) |
| ALIAS | VARCHAR2(50) |
| DATA_CATEGORY_ID | NUMBER(10) |
| INFORMATION_DESCRIPTION | VARCHAR2(250) |
| DATA_RETENTION_PERIOD | NUMBER(10) |
| DATA_RETENTION_MEASURE | NUMBER(10) |
| DATA_RETENTION_HOLD | VARCHAR2(30) |
| USER_DESCRIPTION | VARCHAR2(100) |
| PHYSICAL_LOCATION_ID | NUMBER(10) |
| PHYSICAL_LOCATION_OTHER_DESC | VARCHAR2(50) |
| BUSINESS_UNIT_ID | NUMBER(10) |
| DATA_OWNER | NUMBER(10) |
| DATA_OWNER_CONTACT | NUMBER(10) |
| INFORMATION_SOURCE_NAME | VARCHAR2(100) |
| SOURCE_DEVELOPER | NUMBER(10) |
| SAFEGUARD | NUMBER(10) |
| CREATOR | NUMBER(10) |
| CREATION_DATE | DATE |
| LAST_MODIFIER | NUMBER(10) |
| LAST_MODIFIED_DATE | DATE |
| COMMON_NAME | VARCHAR2(50) |
| TRANSMIT_ACTIVITY_ID | NUMBER(10) |
| TRANSMIT_TO | VARCHAR2(50) |
| TRANSMIT_FREQUENCY | VARCHAR2(50) |
| TRANSMIT_METHOD | VARCHAR2(50) |
| SOLUTION_IMPLEMENTED_ID | NUMBER(10) |
| SOLUTION_IMPLEMENTED_OTHER | VARCHAR2(250) |
| WAVE_ASSIGNMENT | NUMBER(10) |
| RECOMMENDATION | VARCHAR2(1000) |
| SCOPE_ID | NUMBER(10) |
| SCOPE_OTHER | VARCHAR2(100) |
| INTERNET_FACING | NUMBER(10) |
| INTERNET_FACING_URL | VARCHAR2(100) |
| **DC_DATA_SOURCE_APPLICATION** | |
| UNIQUEID | NUMBER(10) |
| DATA_SOURCE_ID | NUMBER(10) |
| CORE_APPLICATION_ID | NUMBER(10) |
| EXPLANATION | VARCHAR2(50) |
| **DC_DATA_SOURCE_COMMENT** | |
| UNIQUEID | NUMBER(10) |
| STATEMENT | VARCHAR2(250) |
| USER_ID | NUMBER(10) |
| DATA_SOURCE_ID | NUMBER(10) |
| COMMENT_DATE | DATE |
| **DC_DATA_SOURCE_CONTACT** | |
| UNIQUEID | NUMBER(10) |
| CONTACT_TYPE | NUMBER(10) |
| DATA_SOURCE_ID | NUMBER(10) |
| CONTACT_INFO_ID | NUMBER(10) |
| **DC_DATA_SOURCE_ELEMENT** | |
| UNIQUEID | NUMBER(10) |
| DATA_SOURCE_ID | NUMBER(10) |
| DATA_ELEMENT_ID | NUMBER(10) |
| DATA_CONTROL | NUMBER(20) |
| DATA_ELEMENT_OTHER_DESC | VARCHAR2(255) |
| OCCURRENCE | NUMBER(20) |

TABLE 1-continued

| | |
|---|---|
| DC_DATA_SOURCE_TEMPLATE | |
| UNIQUEID | NUMBER(10) |
| COMMON_NAME | VARCHAR2(50) |
| DATA_OWNER | NUMBER(10) |
| DATA_OWNER_CONTACT | NUMBER(10) |
| BUSINESS_UNIT_ID | NUMBER(10) |
| DC_DE_INVENTORY_ELEMENT | |
| UNIQUEID | NUMBER(10) |
| DATA_ELEMENT_ID | NUMBER(10) |
| DATA_ELEMENT_INVENTORY_DATA_ID | NUMBER(10) |
| DC_DS_DEVELOPER_EXPLANATION | |
| UNIQUEID | NUMBER(10) |
| DATA_SOURCE_ID | NUMBER(10) |
| CONTROL_FLAG | NUMBER(10) |
| EXPLANATION | VARCHAR2(50) |
| DC_DS_INTERNAL_COMMENT | |
| UNIQUEID | NUMBER(10) |
| STATEMENT | VARCHAR2(250) |
| USER_ID | NUMBER(10) |
| DATA_SOURCE_ID | NUMBER(10) |
| DC_DS_SAFEGUARD_EXPLANATION | |
| UNIQUEID | NUMBER(10) |
| DATA_SOURCE_ID | NUMBER(10) |
| CONTROL_FLAG | NUMBER(10) |
| EXPLANATION | VARCHAR2(50) |
| DC_EDIT_ACCESS | |
| UNIQUEID | NUMBER(10) |
| USER_ID | NUMBER(10) |
| DATA_SOURCE_ID | NUMBER(10) |
| DC_INFORMATION_TYPE | |
| UNIQUEID | NUMBER(10) |
| DESCRIPTION | VARCHAR2(50) |
| HELP_DESCRIPTION | VARCHAR2(255) |
| DELETED | NUMBER(1) |
| RANK | NUMBER(10) |
| DC_LOG_ENTRY | |
| UNIQUEID | NUMBER(10) |
| DATA_SOURCE_ID | NUMBER(10) |
| CHANGE_DESCRIPTION | VARCHAR2(255) |
| USER_ID | NUMBER(10) |
| CHANGE_DATE | DATE |
| DC_MESSAGES | |
| UNIQUEID | NUMBER(10) |
| MESSAGE | VARCHAR2(255) |
| RANK | NUMBER(10) |
| DC_PHYSICAL_LOCATION | |
| UNIQUEID | NUMBER(10) |
| DESCRIPTION | VARCHAR2(50) |
| OTHER_FLAG | NUMBER(1) |
| DELETED | NUMBER(1) |
| RANK | NUMBER(10) |
| DC_PLATFORM_TYPE | |
| UNIQUEID | NUMBER(10) |
| DESCRIPTION | VARCHAR2(50) |
| OTHER_FLAG | NUMBER(1) |
| DELETED | NUMBER(1) |
| HELP_DESCRIPTION | VARCHAR2(255) |
| RANK | NUMBER(10) |
| DC_RISK_FACTOR | |
| UNIQUEID | NUMBER(10) |
| DESCRIPTION | VARCHAR2(50) |
| DELETED | NUMBER(1) |
| RANK | NUMBER(10) |

TABLE 1-continued

| | |
|---|---|
| DC_RISK_FACTOR_INVENTORY_DATA | |
| UNIQUEID | NUMBER(10) |
| RISK_RATING_MODEL_ID | NUMBER(10) |
| RISK_FACTOR_ID | NUMBER(10) |
| RISK_POINT | NUMBER(10) |
| DC_RISK_RATING_MODEL | |
| UNIQUEID | NUMBER(10) |
| MODEL_NAME | VARCHAR2(20) |
| DESCRIPTION | VARCHAR2(100) |
| DC_SAFEGUARD | |
| UNIQUEID | NUMBER(10) |
| DESCRIPTION | VARCHAR2(100) |
| FLAG_BIT | NUMBER(10) |
| OTHER_FLAG | NUMBER(1) |
| HELP_DESCRIPTION | VARCHAR2(500) |
| DELETED | NUMBER(1) |
| RANK | NUMBER(10) |
| DC_SCOPE | |
| UNIQUEID | NUMBER(10) |
| DESCRIPTION | VARCHAR2(50) |
| OTHER_FLAG | NUMBER(1) |
| DELETED | NUMBER(1) |
| RANK | NUMBER(10) |
| IN_SCOPE | NUMBER(1) |
| DC_SOLUTION_IMPLEMENTED | |
| UNIQUEID | NUMBER(10) |
| DESCRIPTION | VARCHAR2(50) |
| OTHER_FLAG | NUMBER(1) |
| DELETED | NUMBER(1) |
| RANK | NUMBER(10) |
| DC_SOURCE_DEVELOPER | |
| UNIQUEID | NUMBER(10) |
| DESCRIPTION | VARCHAR2(50) |
| OTHER_FLAG | NUMBER(1) |
| FLAG_BIT | NUMBER(10) |
| DELETED | NUMBER(1) |
| RANK | NUMBER(10) |
| DC_SOURCE_TYPE | |
| UNIQUEID | NUMBER(10) |
| INFORMATION_TYPE_ID | NUMBER(10) |
| DESCRIPTION | VARCHAR2(50) |
| OTHER_FLAG | NUMBER(1) |
| DELETED | NUMBER(10) |
| RANK | NUMBER(10) |
| DC_TRANSMIT_ACTIVITY | |
| UNIQUEID | NUMBER(10) |
| DESCRIPTION | VARCHAR2(100) |
| OTHER_FLAG | NUMBER(1) |
| DELETED | NUMBER(1) |
| RANK | NUMBER(10) |
| DC_USER | |
| UNIQUEID | NUMBER(10) |
| USERID | CHAR(7) |
| USER_LNAME | VARCHAR2(50) |
| EMAIL | VARCHAR2(50) |
| USER_TYPE | NUMBER(10) |
| CREATE_DATA_SOURCE | NUMBER(1) |
| USER_FNAME | VARCHAR2(50) |
| BUSINESS_UNIT | NUMBER(10) |
| CREATE_TEMPLATE | NUMBER(1) |
| DC_VIEW_ACCESS | |
| UNIQUEID | NUMBER(10) |
| USER_ID | NUMBER(10) |
| DATA_SOURCE_ID | NUMBER(10) |

Table 2 illustrates groupings of data elements of Table 1 by category.

TABLE 2

| Highly Sensitive Data Element Grouping | Highly Sensitive Data Element |
|---|---|
| Identity Theft Enablers | Social Security Number (SSN) |
| | SSN-Any partial portion |
| | CUID |
| | Driver's License Number |
| | State Issued ID Card Number |
| | Personal Bank Account Number |
| | Corporate Bank Account Number |
| | Positive Pay Information Check Num/Payee/Amount |
| | Bank Routing Num with Bank Account Num |
| | Corporate Credit Card Number |
| | Personal Credit Card Number |
| | Debit Card Number |
| | Account Passwords or PINs |
| | Consumer Credit Report |
| | Stored Password Hint Answers |
| | Biometrics Scanned Image |
| | Calling Card Number |
| | Customer Call Detail-Billing Address |
| | Customer Call Detail-Service/Equipment |
| | Other Contacts & ID Codes |
| | Customer Total Bill Amount |
| Employee-Related-Non ID Theft | Salary Information-Other Paycheck Data |
| | Salary Information-Other Employment Data |
| | Salary Information-Other Personal Data |
| | Personnel File Information-other than any highly sensitive data elements noted herein |
| | Management Discipline Info (when it can be associated with an individual employee) |
| | 401K Account Balances |
| | Pension Account Balances |
| | Deferred Compensation Plan Balances |
| Customer Info | Customer Call Detail-Originating Call Number |
| | Customer Call Detail-Terminating Call Number |
| | Customer Call Detail-Date of Call |
| | Customer Call Detail-Time of Call |
| | Customer Call Detail-Duration of Call |
| | Unpublished Service Address |
| | Unpublished Phone Numbers NOT Clearly Identifiable or CANNOT be Associated with Owner |
| | Unpublished Phone Numbers Clearly Identifiable and Associated with Owner |
| | Customer Bill Dollar Amount Components |
| | Customer Internet Usage-Originating IP Address |
| | Customer Internet Usage-Calling Station ID |
| | Customer Internet Usage-Date |
| | Customer Internet Usage-User Name |
| | Customer Internet Usage-E-mail Address |
| | Customer Internet Usage-Connecting Password |
| | IP Assignment Info for Websites Accessed |
| | Security-Subpoena Info |
| | Marketing list-E-mail Addresses |
| | Unpublished Phone Numbers Not Clearly Identifiable |
| PHI | Protected Health Information (PHI) |
| Strategic | Bargaining Information (Includes proposal, cost data, and rational data elements) |
| | M&A/Strategy/R&D Information |
| | Earnings Data Prior to Public Release |
| | Contract Competitive Pricing Bid Information |
| Complaints/Investigations | EEOC Charge Activity |
| | EEO Case Info |
| | Ethics Case Info |
| | Security Case Info (Case Title and Subject, Case Details, Case Notes, & attachments) |
| | Claims Diary Notes |
| | Internal Audit Info-Restricted Distributions Only |
| | Network Vulnerability and Configuration Info-Restricted Distributions Only |
| Legal | Pending Patent Information-Enterprise Reference Number |
| | Pending Patent Information-Serial Number |
| | Pending Patent Information-Disclosure Title |
| | Legal Info-any info subject to attorney client privilege or work product doctrine |
| | Legal Info-any info received or shared pursuit to a protective order |
| | Other Data Specified per Contractual Commitments |

TABLE 2-continued

| Highly Sensitive Data Element Grouping | Highly Sensitive Data Element |
|---|---|
| Other | Other<br>No highly sensitive data elements are included. |

A detailed description of a user interface that may be presented by an enterprise confidential electronic data inventory database management system 110 of FIG. 1 to the enterprise client devices 130 of FIG. 1, according to various embodiments of the invention, will now be described. For ease of description, numbered sections will be used. Moreover, some embodiments of the present invention may be referred to herein as a "Data Classification Inventory Tool" or simply as a "tool". Since this tool was developed within BellSouth Corp., the enterprise will be referred to herein as BellSouth. Moreover, the user of an enterprise client device 130 may be referred to by the second person singular pronoun "you".

1. Overview

Some embodiments of the Data Classification Inventory Tool include a Web-based application with multiple role access levels that will house and manage BellSouth's highly sensitive data elements that meet the restricted or highly confidential definitions. This tool can facilitate the BellSouth Data Classification Process. The BellSouth Data Classification Process includes four categories of electronic information:

Restricted

Highly Confidential

Confidential/Internal Use Only

Public

The Data Classification Inventory Tool focuses on the "Restricted" and the "Highly Confidential" categories only. The other two categories, "Confidential/Internal Use Only and Public," are not currently inventoried in these embodiments. The current Data Classification Inventory scope also does not include information copies for disaster recovery purposes.

1.1 Purpose

The Web-based, Data Classification Tool assists users in the completion of the Data Classification Inventory Process. Each data owner is responsible for identifying and completing the inventory for all highly sensitive data elements that meet the restricted or highly confidential definitions. This inventory tool facilitates the analysis of security safeguards on all "Restricted" and "Highly Confidential" data elements. For example, if highly sensitive data elements are located in a database and copies of extracts are filed on a shared site, one inventory record would be provided for the database and another inventory record for the shared site. If highly sensitive data fields are transmitted via pdf files to other employees, then a third inventory record would be provided for the pdf files. The Data Classification Inventory tool provides a separate inventory record for each information source.

1.2 Background Information

Before the introduction of this tool, there was no known process in place to manage the proposed data collection effort. Ultimately, this tool helps reduce or minimize the risk associated with the accidental disclosure of sensitive or restricted information.

1.3 Basic Tool Capabilities

Core Tool Functionality

1. This application uses BellSouth Common User Login capabilities.
2. Access is role-based.
3. The tool automatically records the date of the last update and the number of the user who made the update.
4. System records date last updated and who made last updates or viewed information.
5. Accountability logs of this activity are kept for at least 30 days.
6. The tool also provides reporting capabilities.
7. This inventory tool facilitates the analysis of security safeguards on all "Restricted" and "Highly Confidential" data elements.

1.4 Tool/Application Requirements

Architecture

1. The application can run within a BellSouth regional datacenter and be located in the green zone of the intranet (90 network).

Role-Based Access

1. Compliance Coordinators: Can View All Business Unit entries for their Business Unit.
2. Project Team: Can View and Edit All. Grants all Access.
3. Data Owner: Can view and edit the information sources they own.
4. Data Owner Contacts: Can view and edit the information sources they create.
5. Risk Analysis Team: View all.
6. User: Can View or Edit information sources based on need.

2. Data Sensitivity Classification Tool Menu Functions 2.1 Main Menu

Home

Enter New Information Source

Edit Information Source

Edit Field Choices

Manage Users

Manage Templates

Field Reports

FAQ

Mail the Team

3. Using the Data Sensitivity Classification Tool 3.1 Getting Started

Figure 5A:
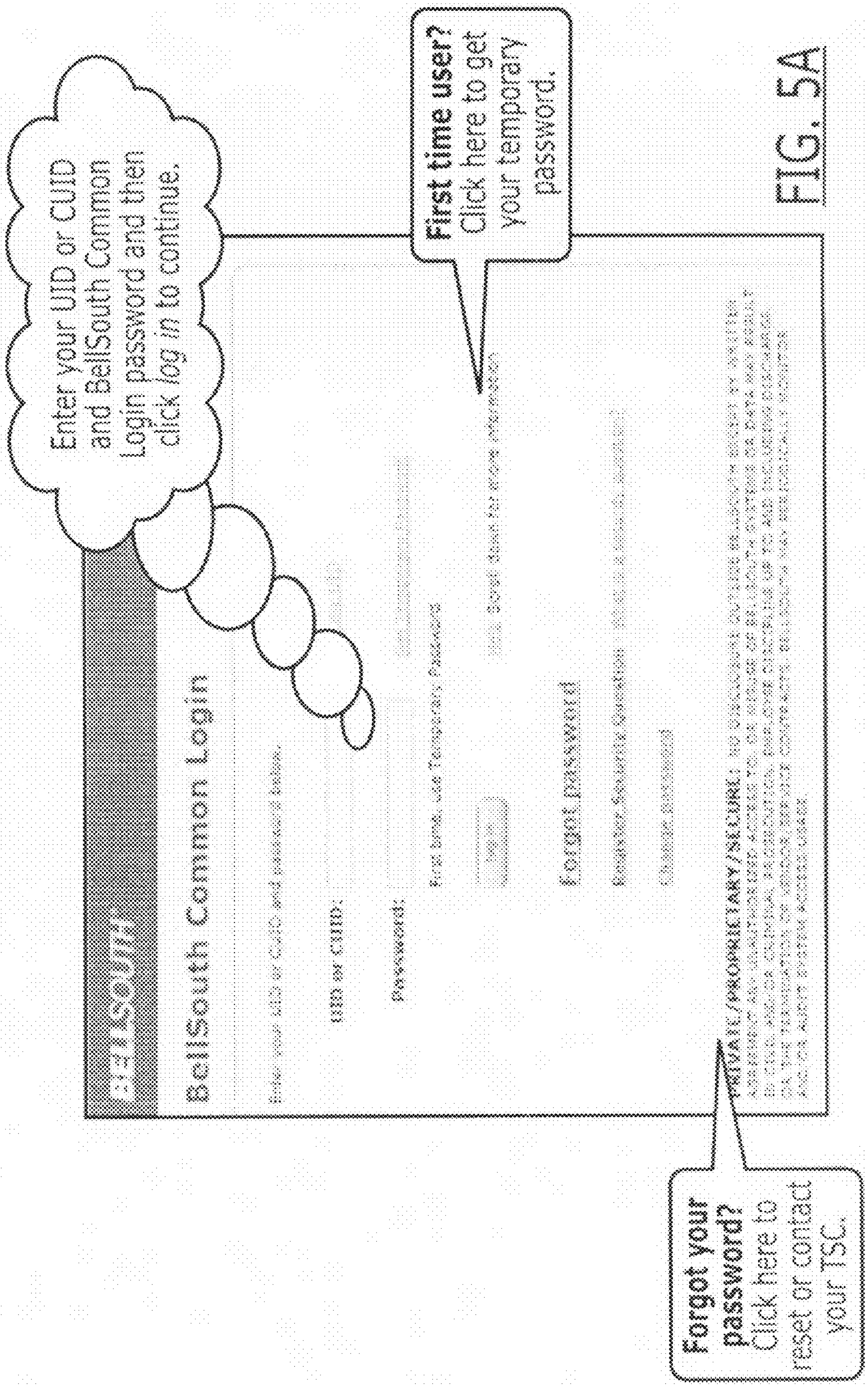
FIGS. 5A-5NN illustrate user interfaces that may be used to store identifying information for the confidential electronic data of the enterprise and to query the identifying information for the confidential electronic data of the enterprise that is stored according to various embodiments of the present invention.
Figure 5B:
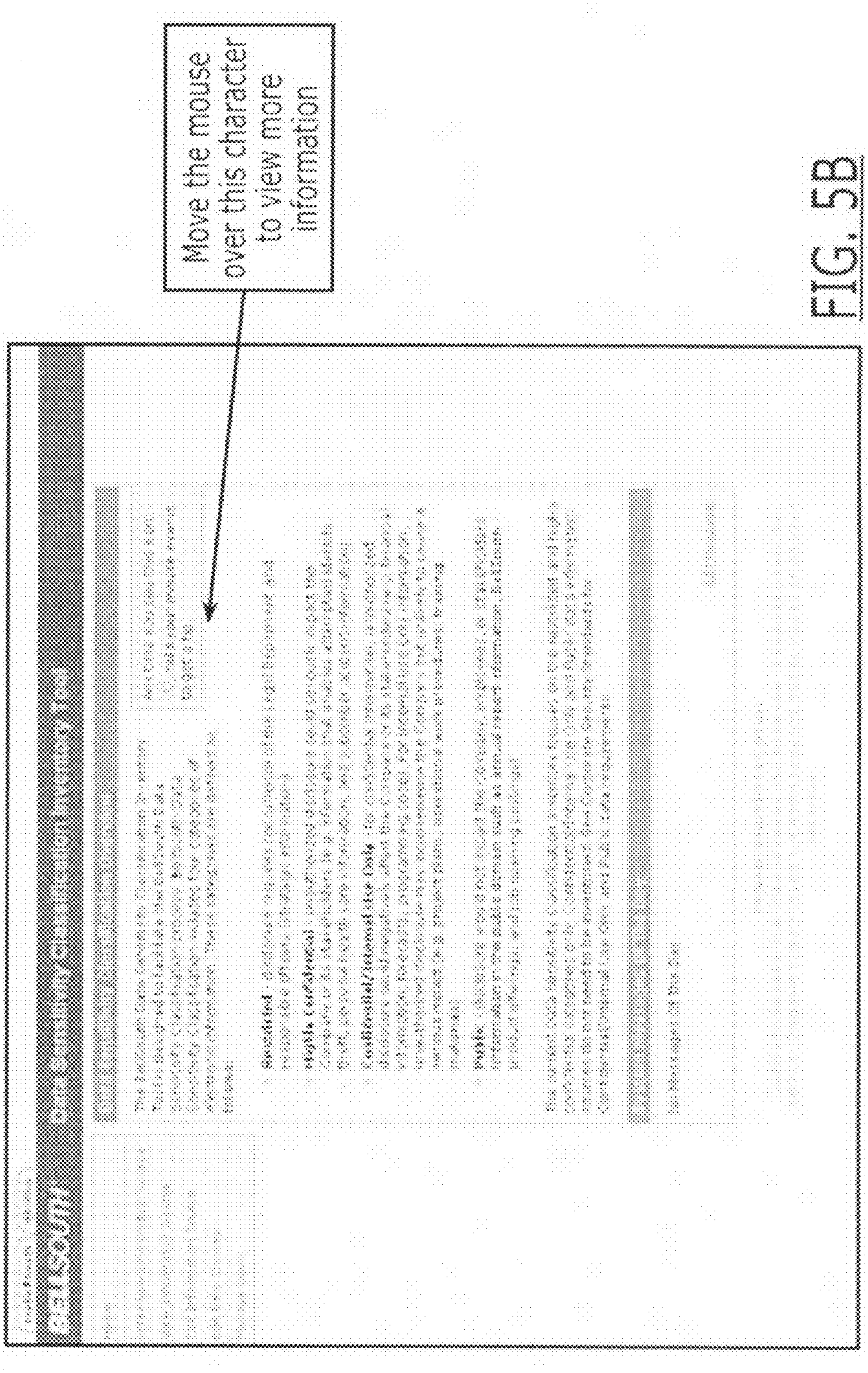

1. Access the Data Sensitivity Classification Tool by opening Internet Explorer and going to a designated Web site.
2. You will be prompted to sign in using your BellSouth Common Login before proceeding to the Tool, as shown in FIG. 5A.
3. After logging in, you will be directed to the Data Sensitivity Classification Tool homepage shown in FIG. 5B.

3.2 Enter a New Information Source 3.2.1 Create a New Information Source

Figure 5C:
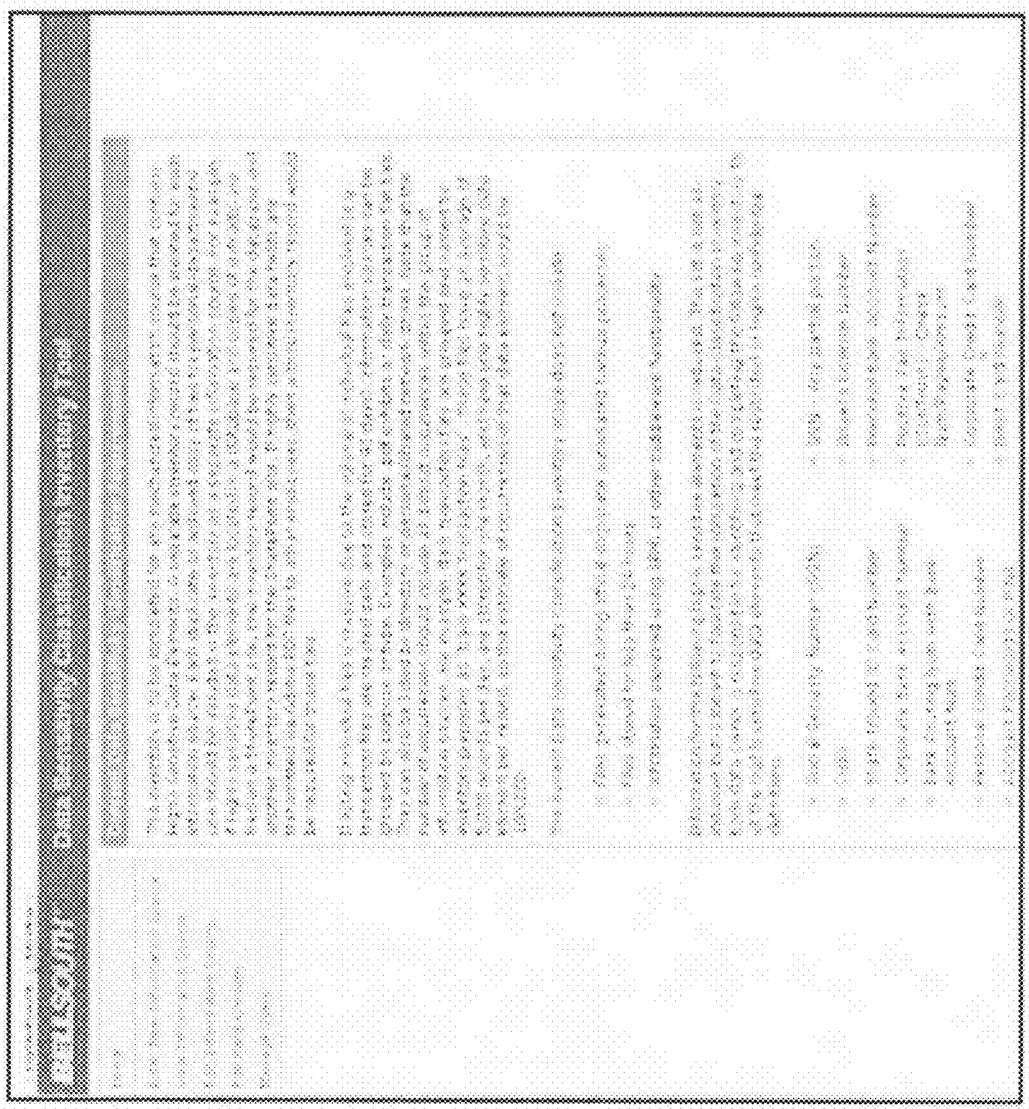
Figure 5D:
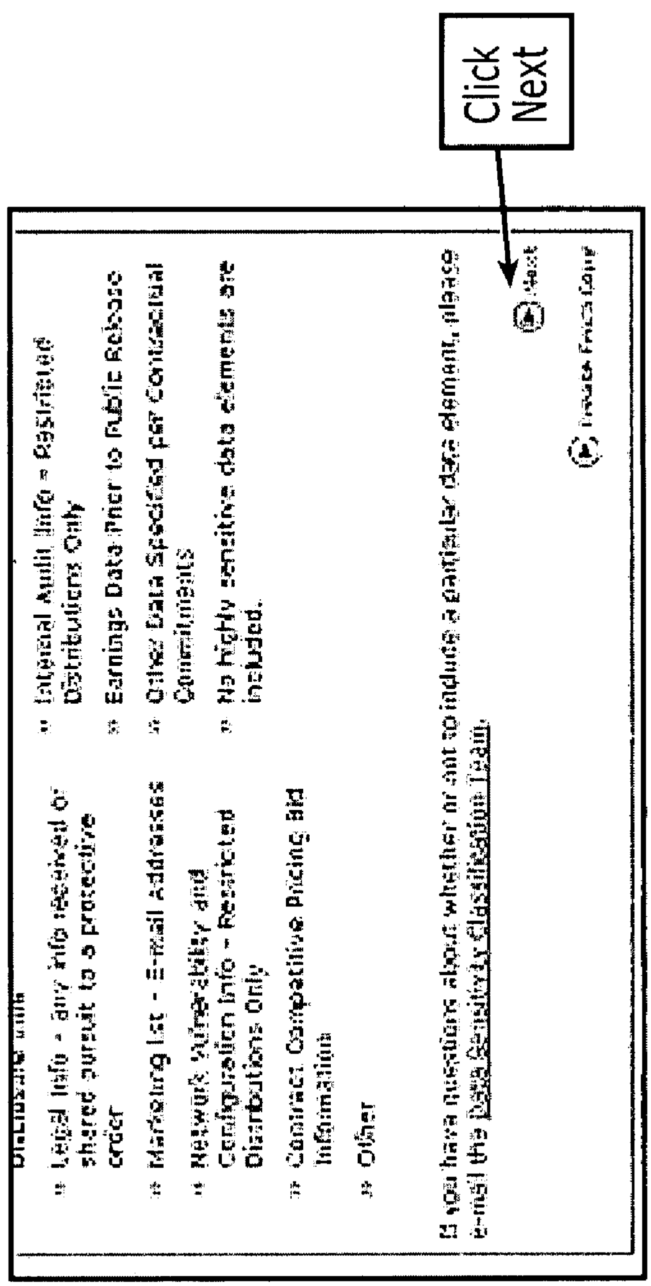

1. Click on the "Enter New Information Source" Menu in the top left corner of the homepage.
2. You will be directed to a page that describes the data classification, as shown in FIG. 5C.
3. Scroll to the bottom of that page and click "Next", as shown in FIG. 5D.
4. You will be directed to the screen shown in FIG. 5E where you will enter your sensitive data information.
5. Enter a "Common Name".

Figure 5E:
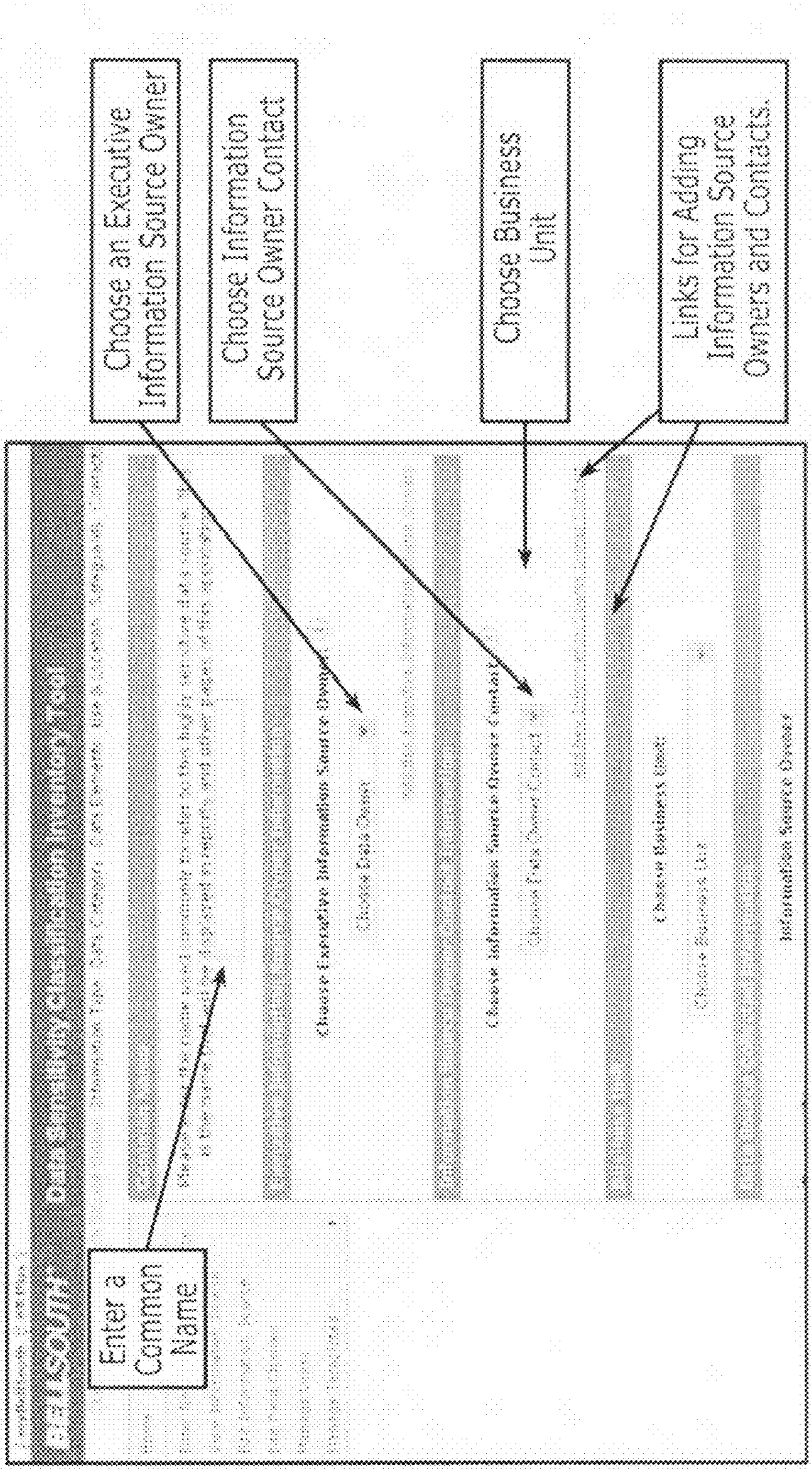
Figure 5F:
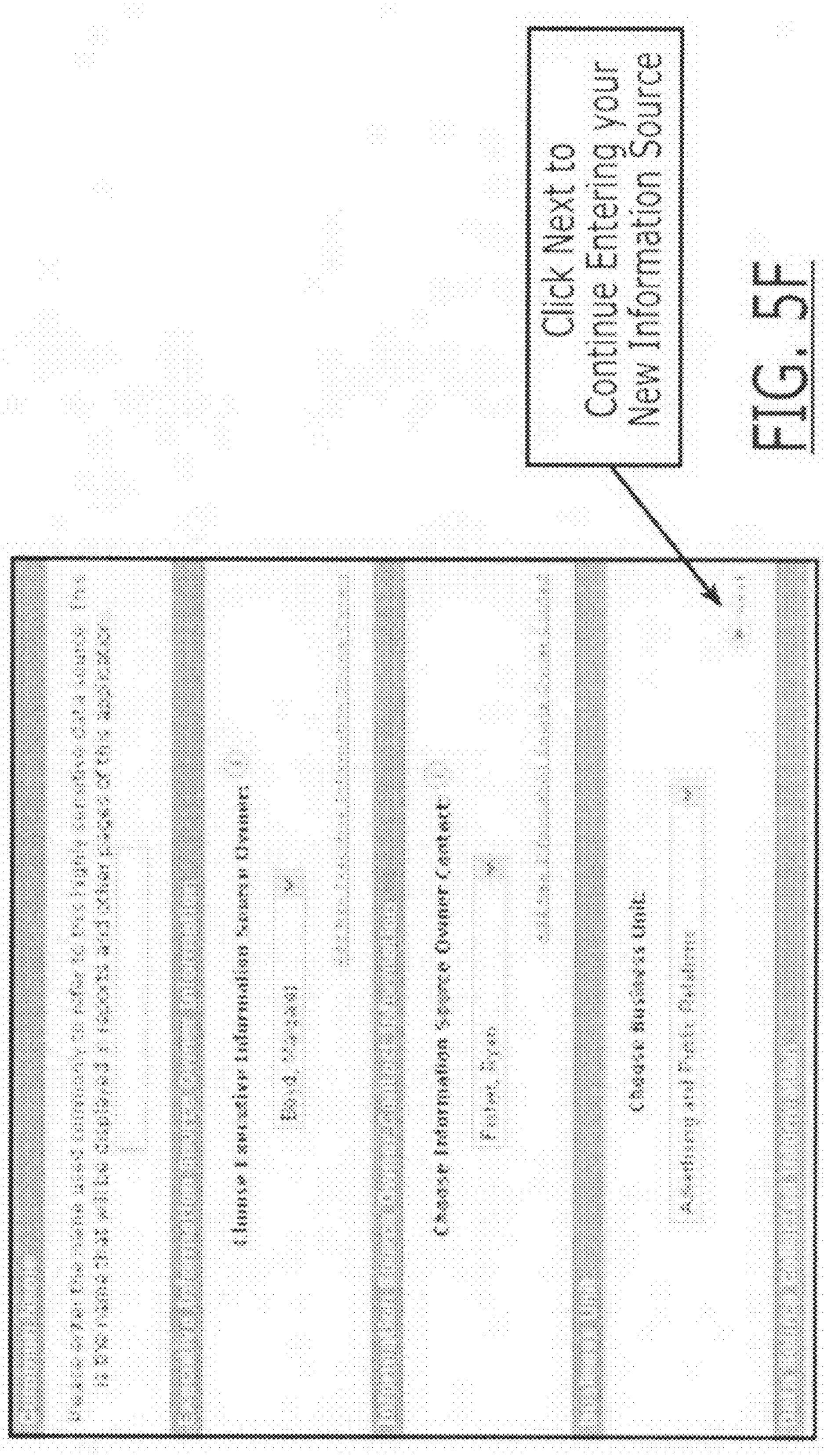
Figure 5G:
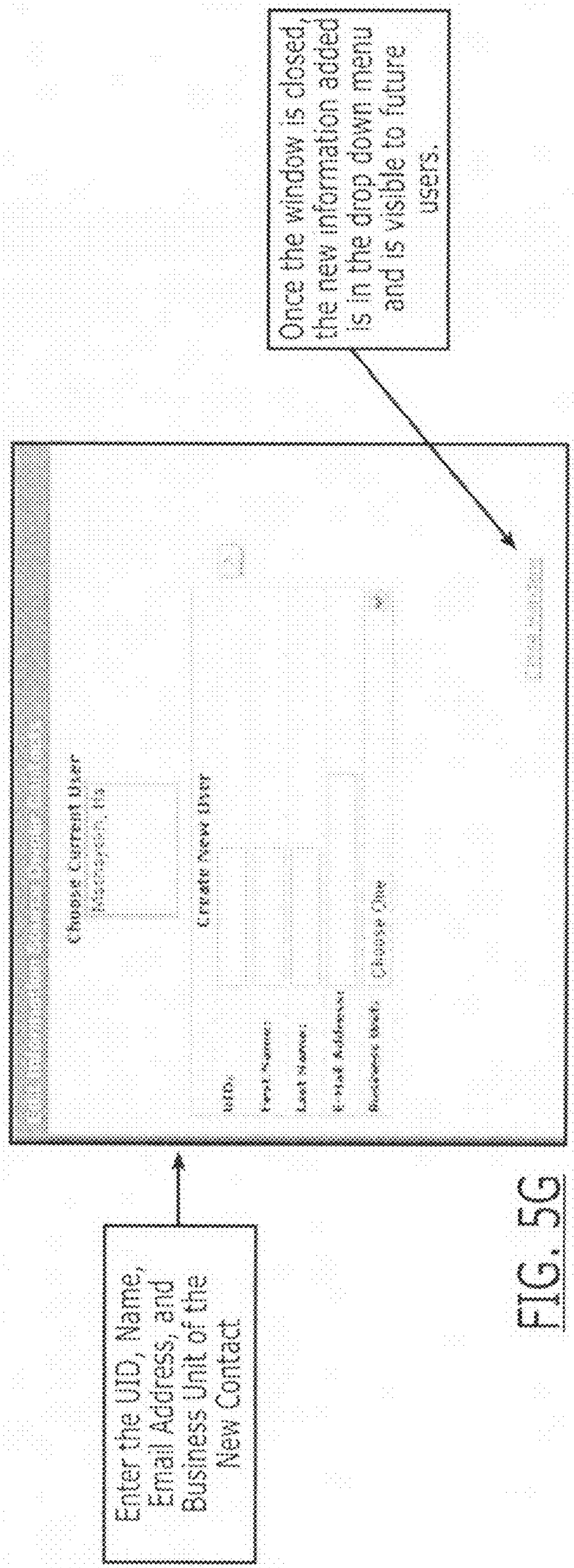
Figure 5H:
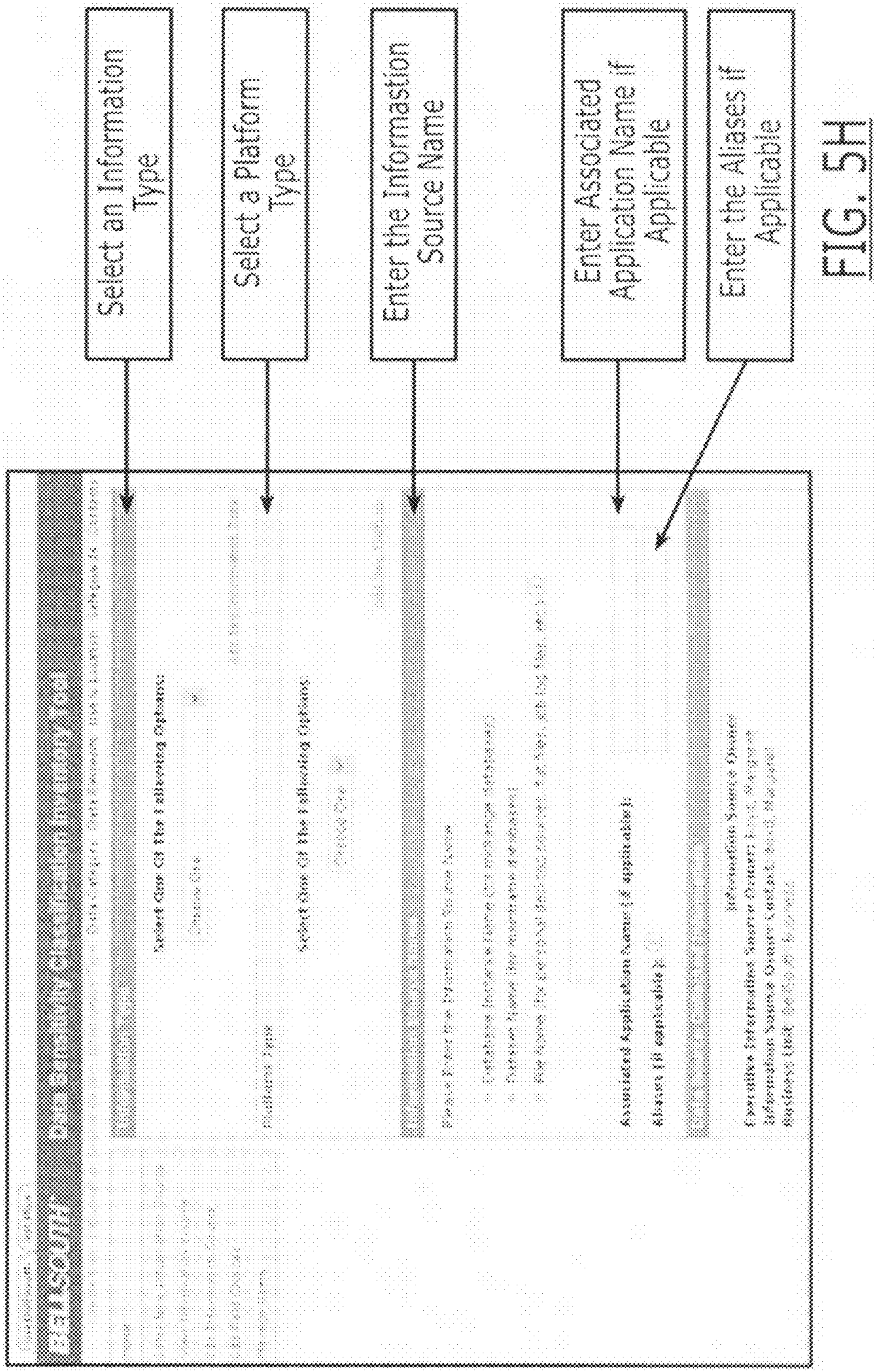
Figure 5I:
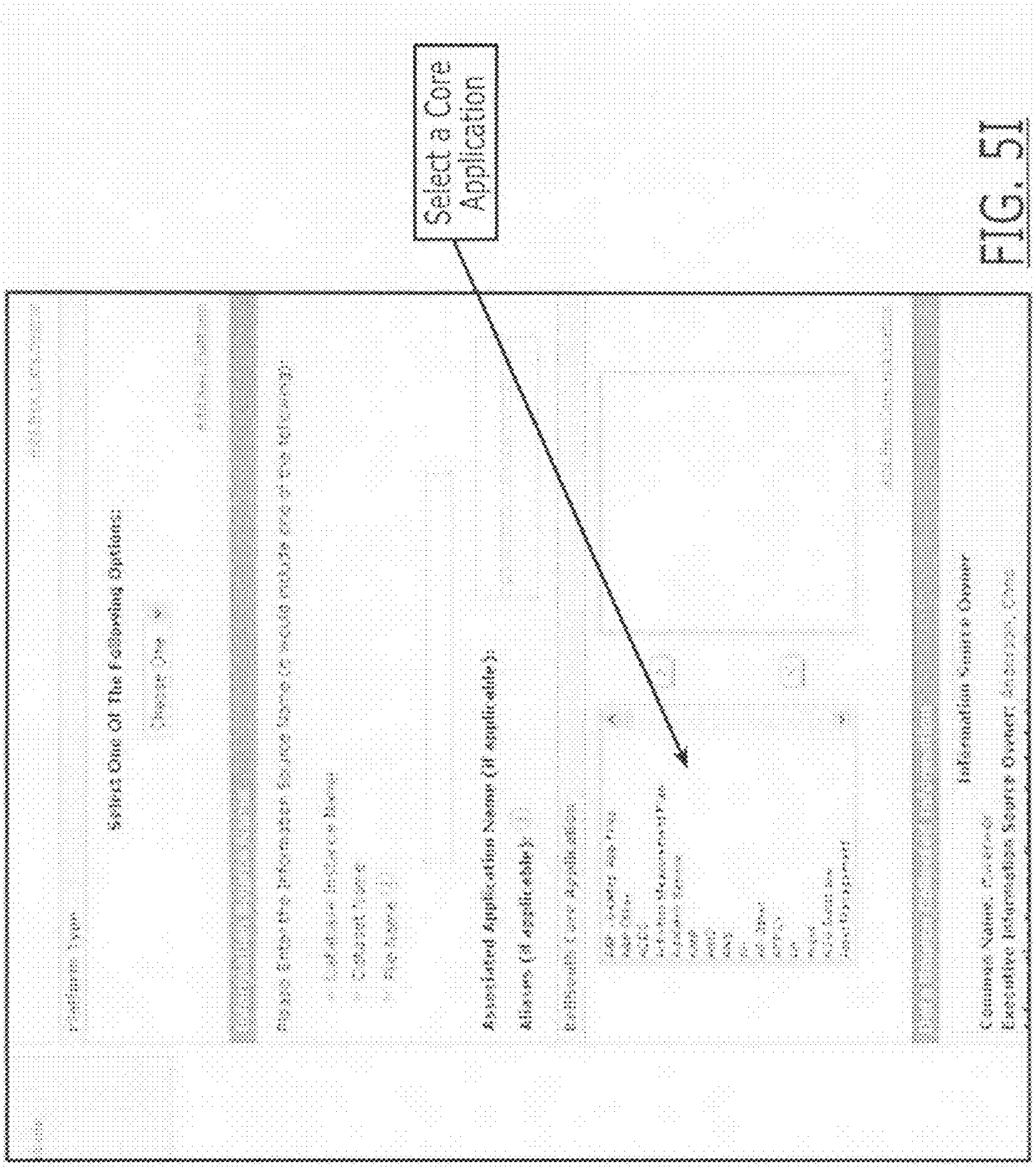
Figure 5J:
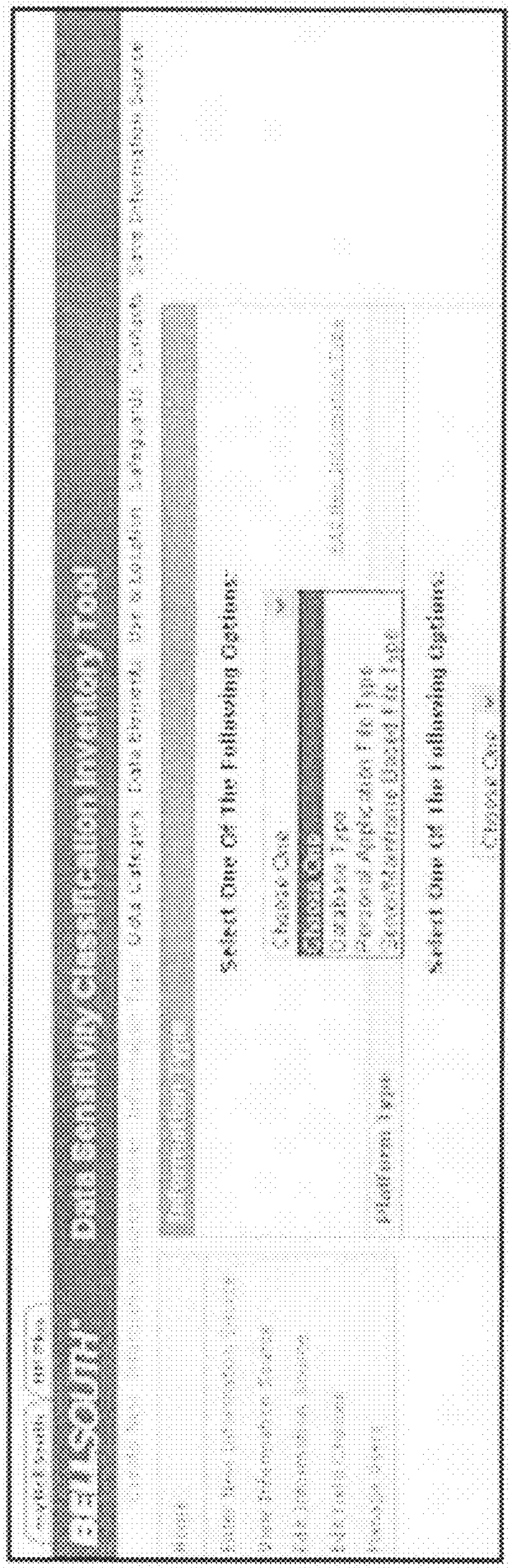
Figure 5K:
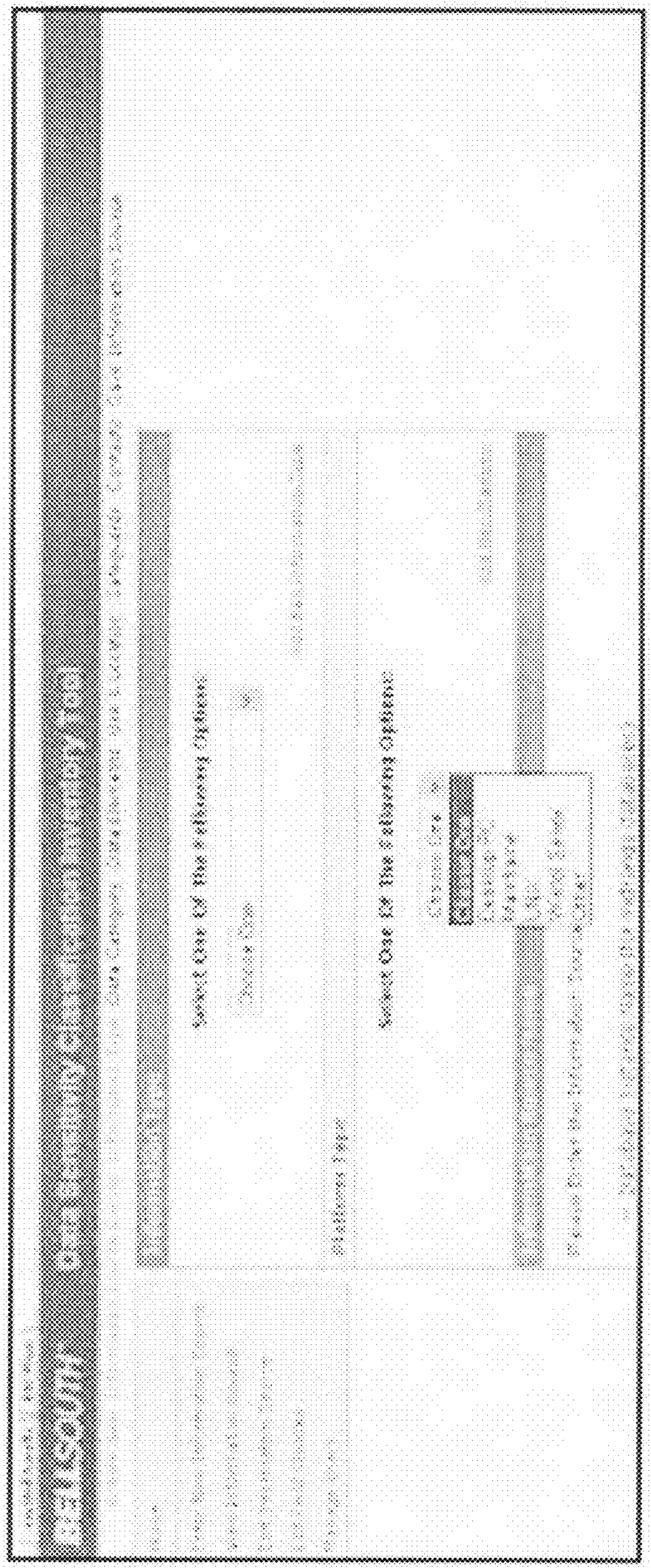
Figure 5L:
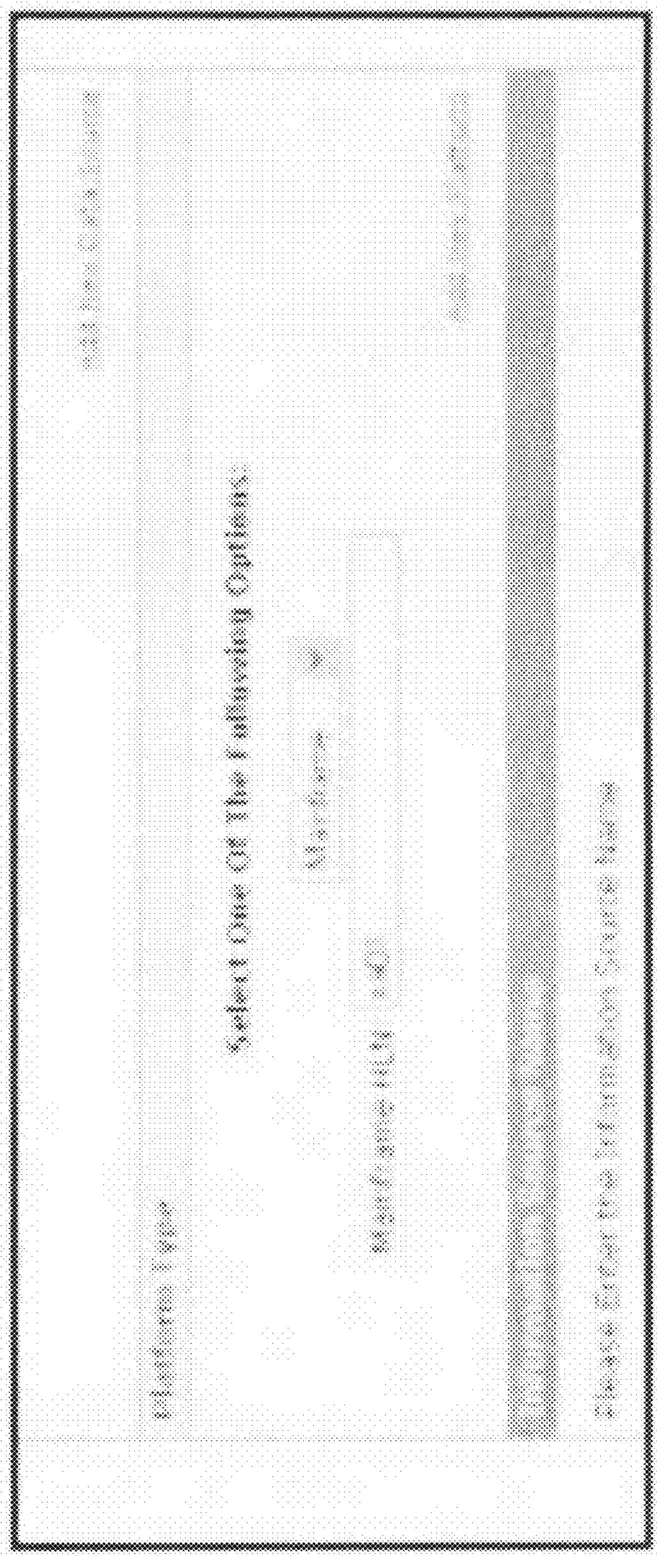
Figure 5M:
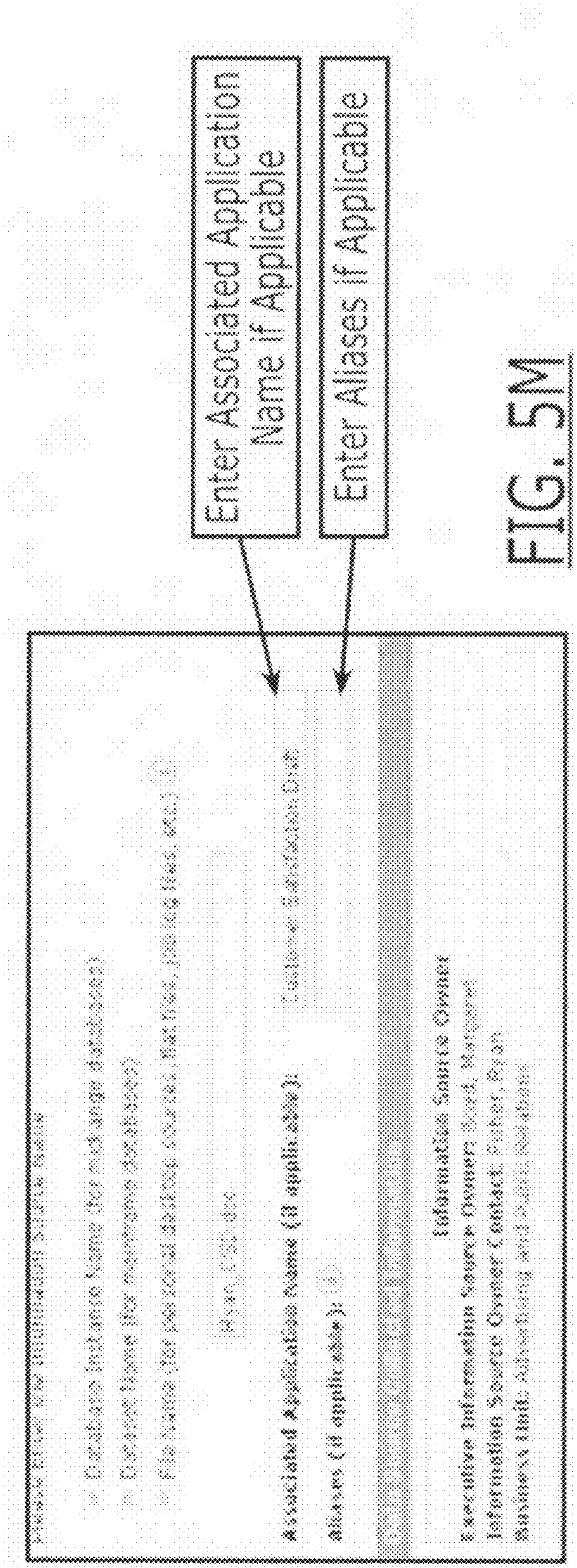
Figure 5N:
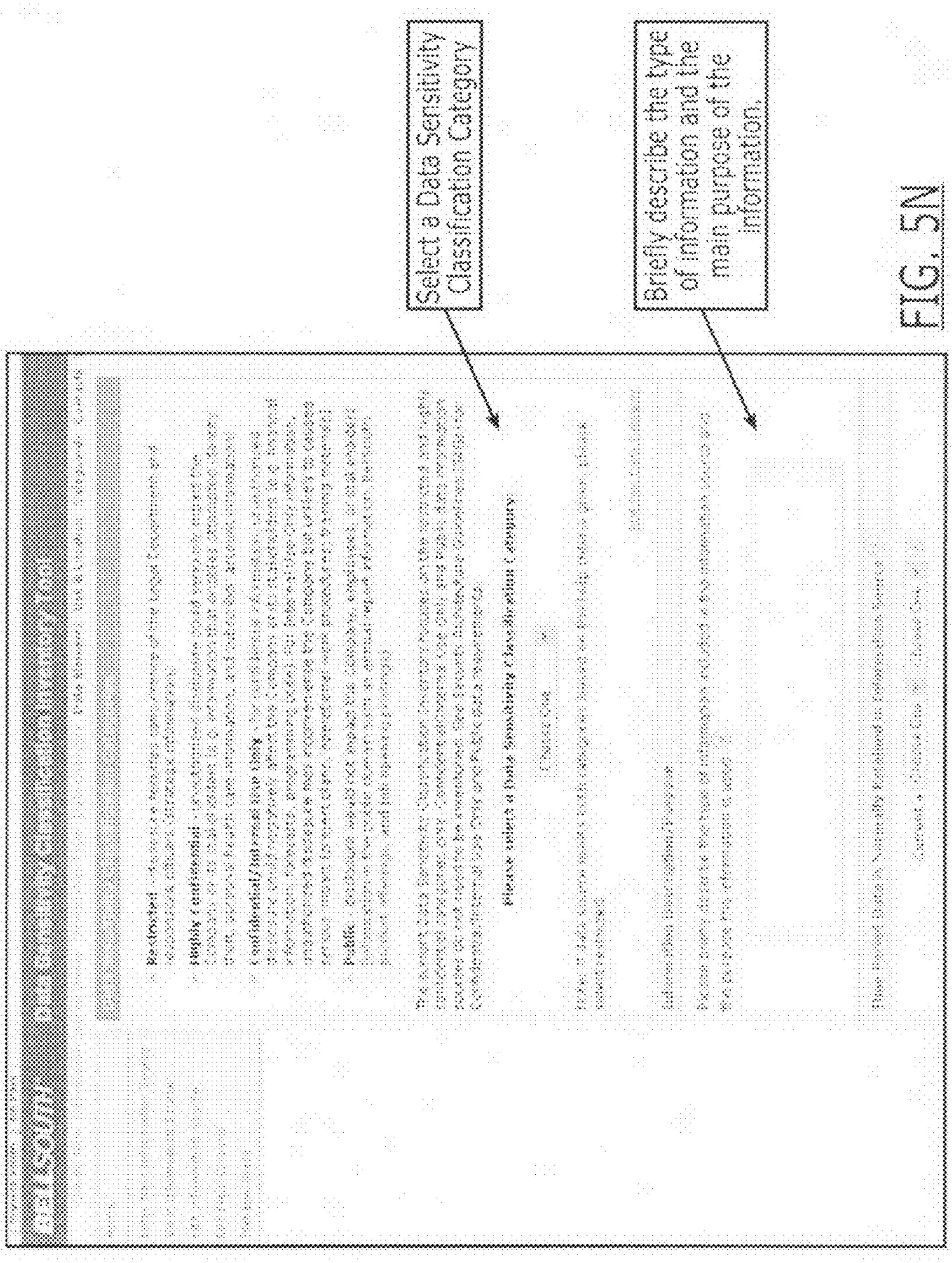
Figure 50:
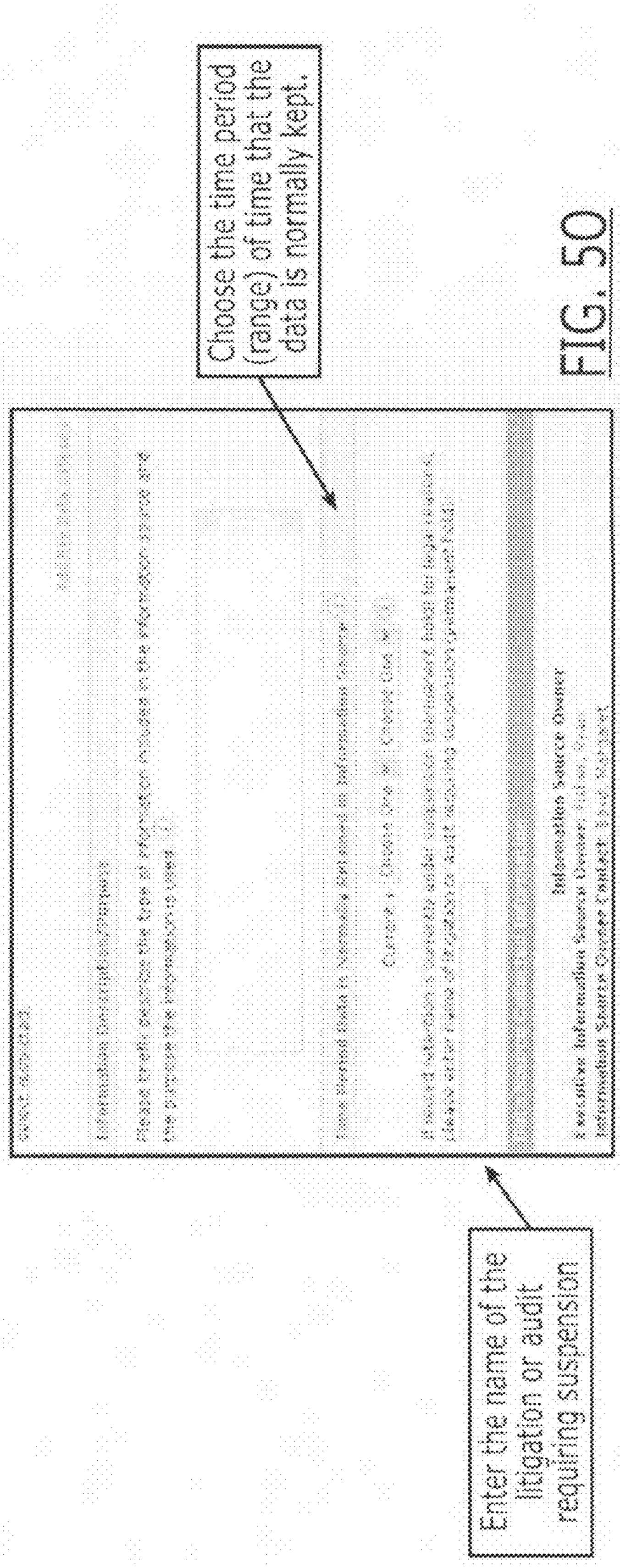
Figure 5P:
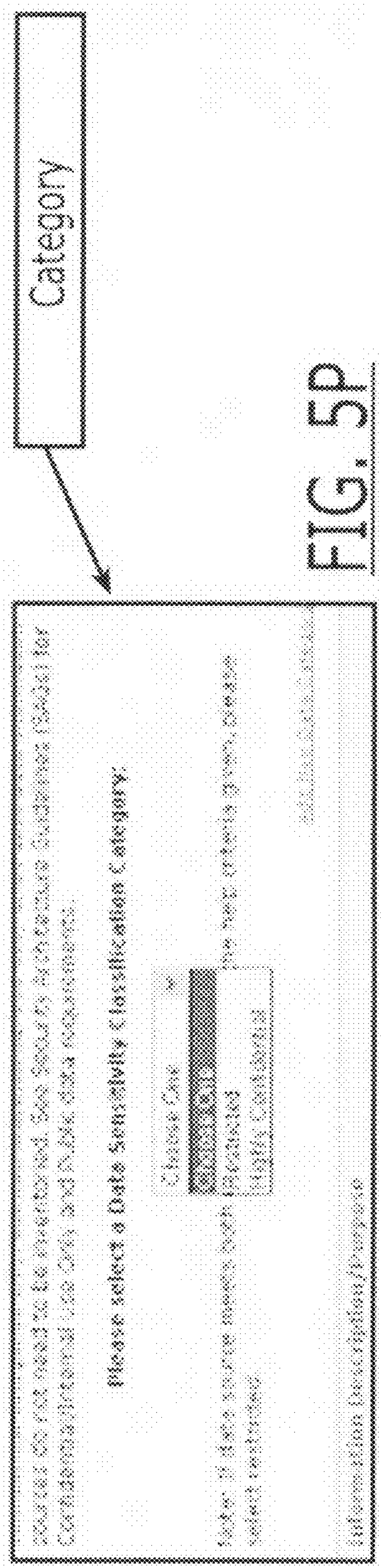
Figure 5Q:
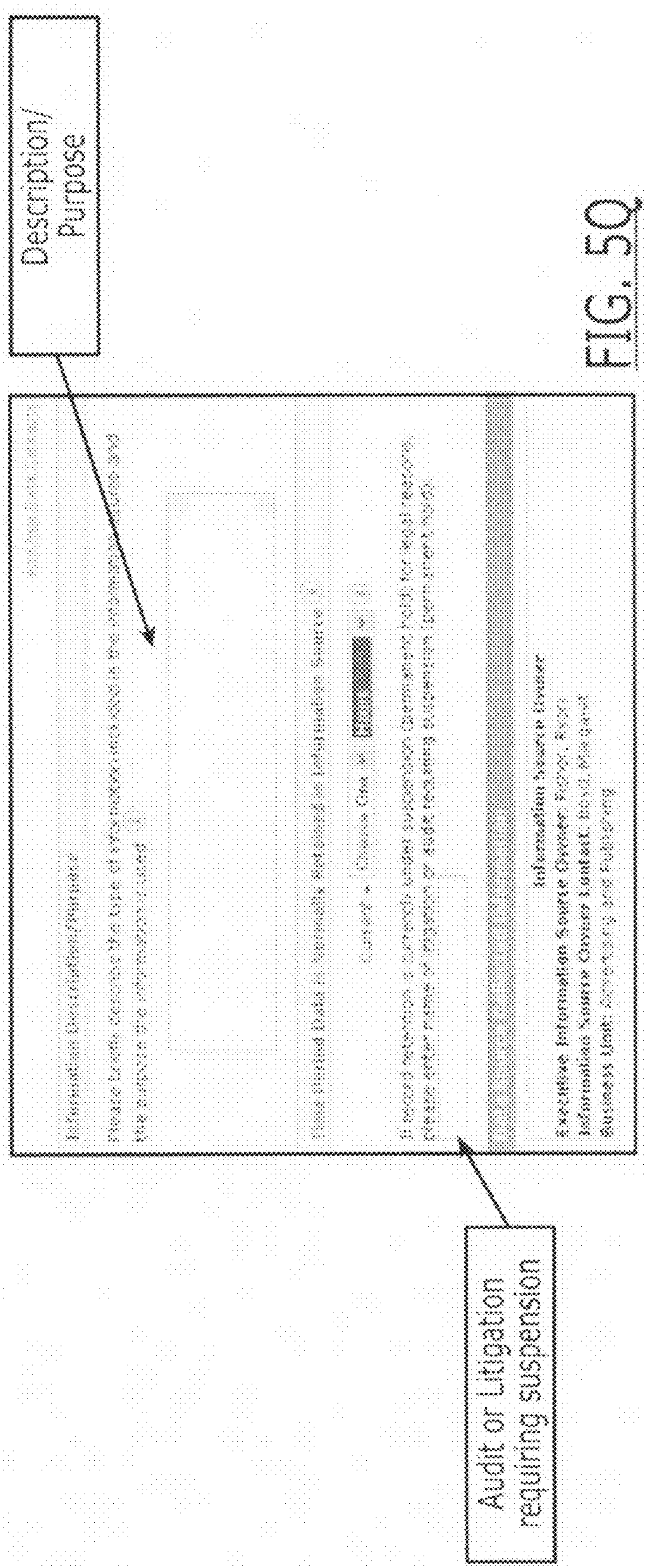
Figure 5R:
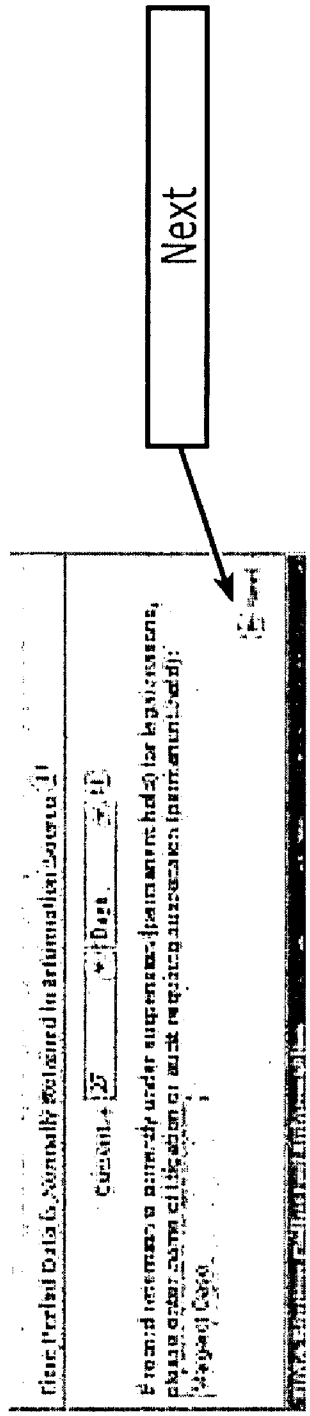
Figure 5S:
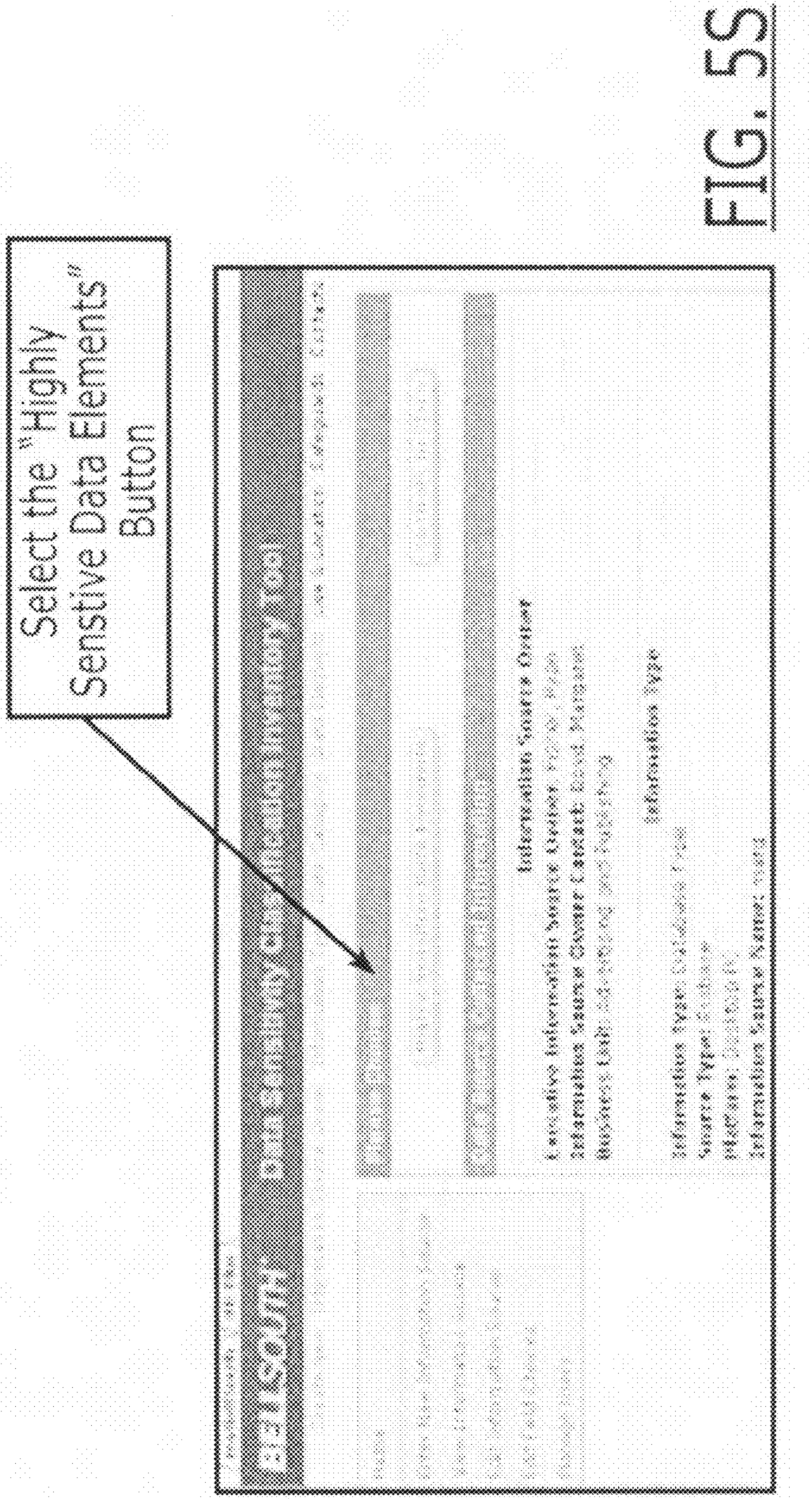
Figure 5T:
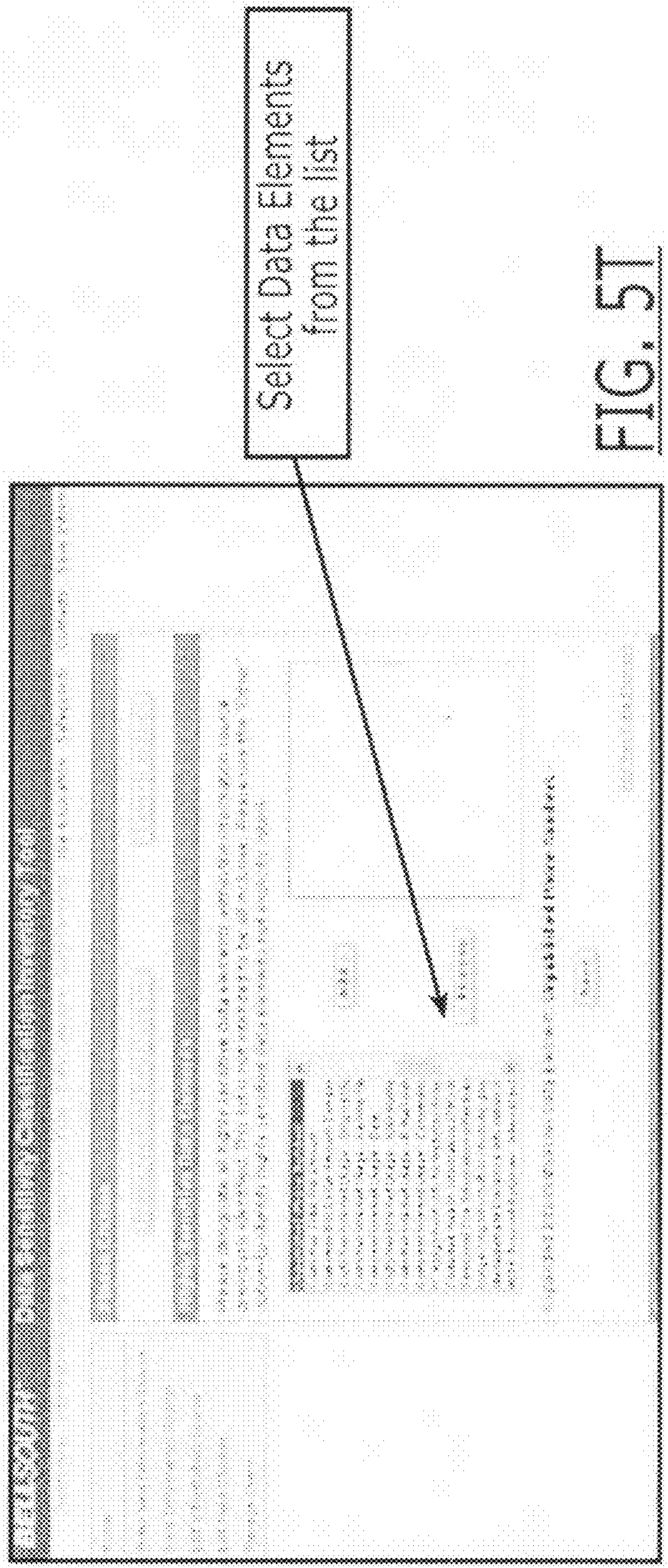
Figure 5U:
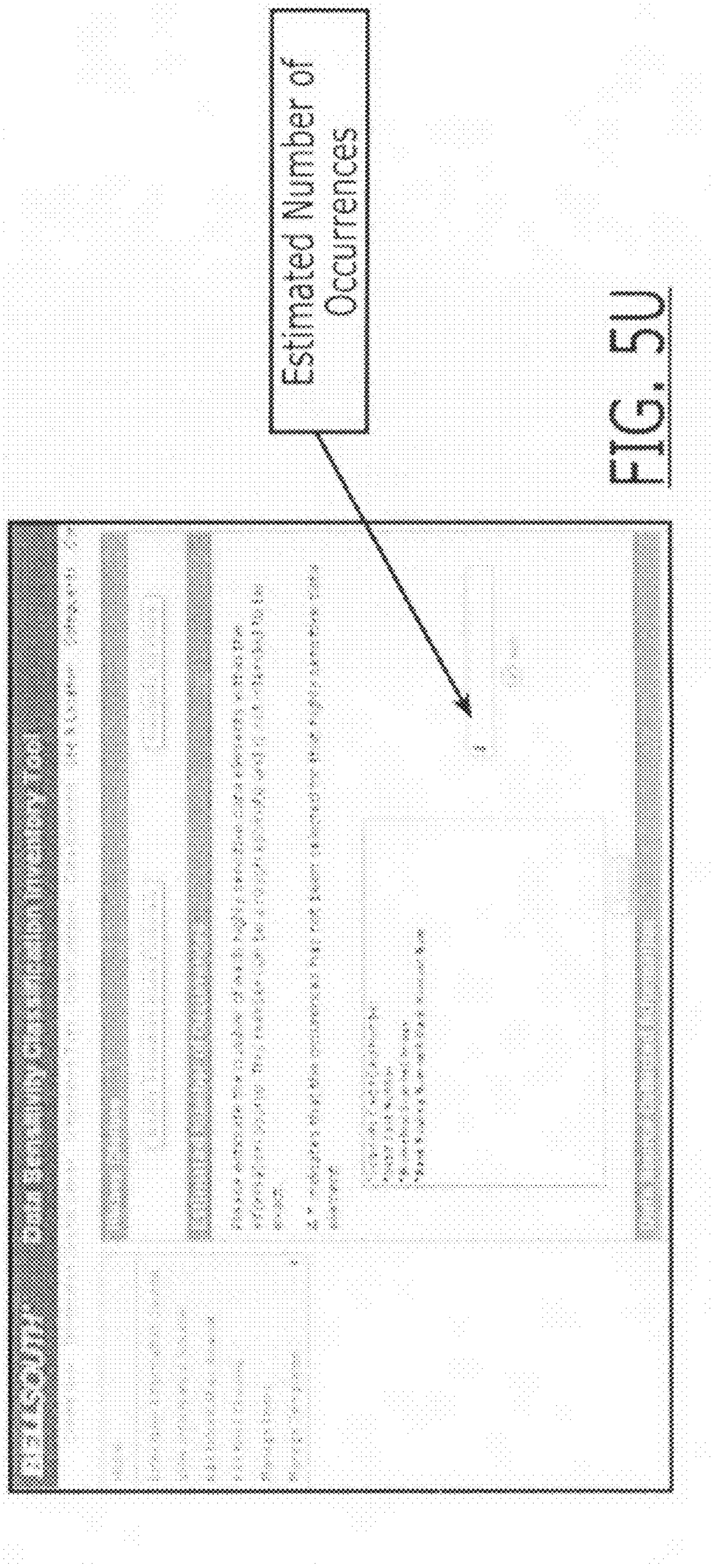
Figure 5V:
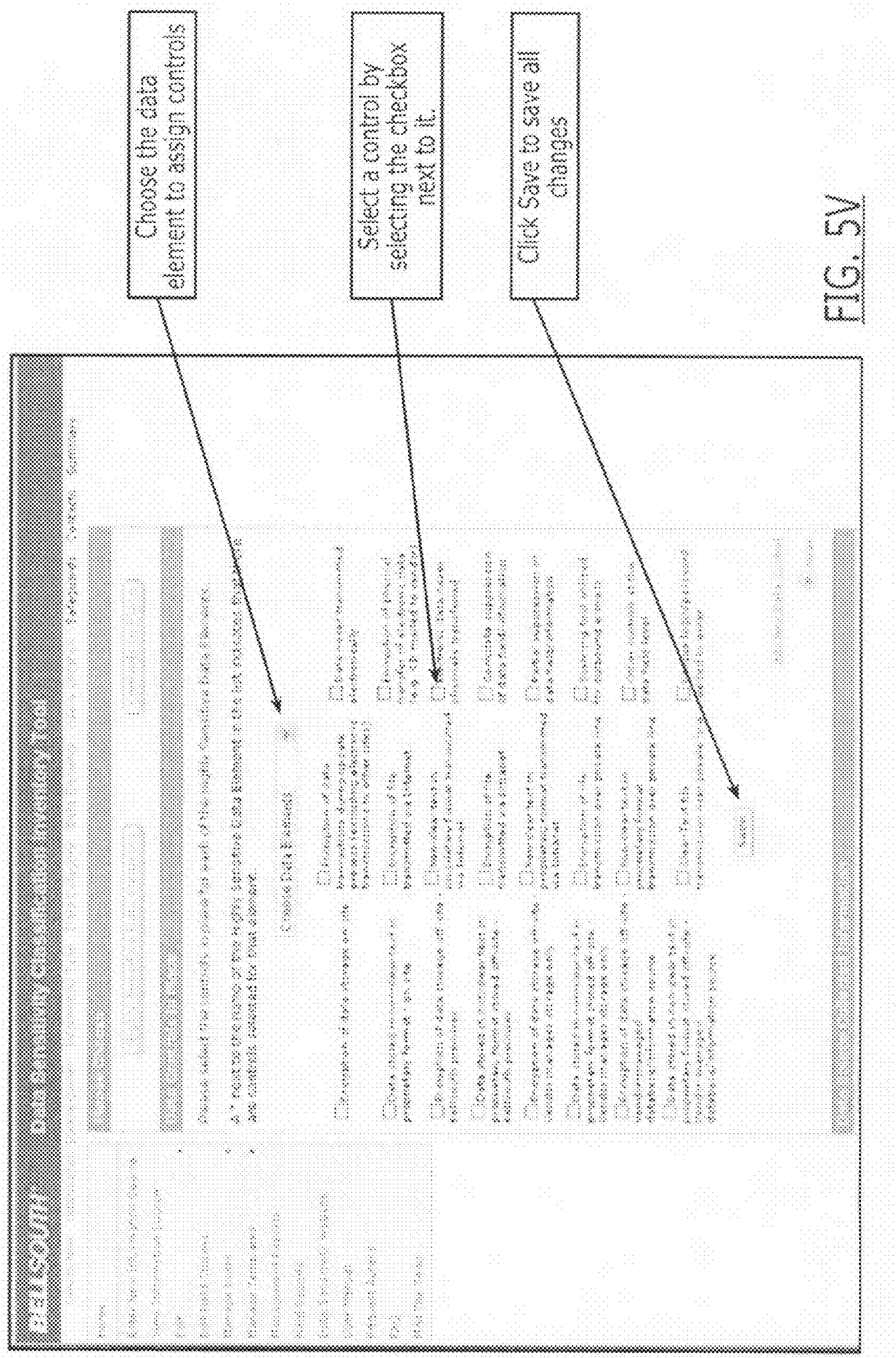
Figure 5W:
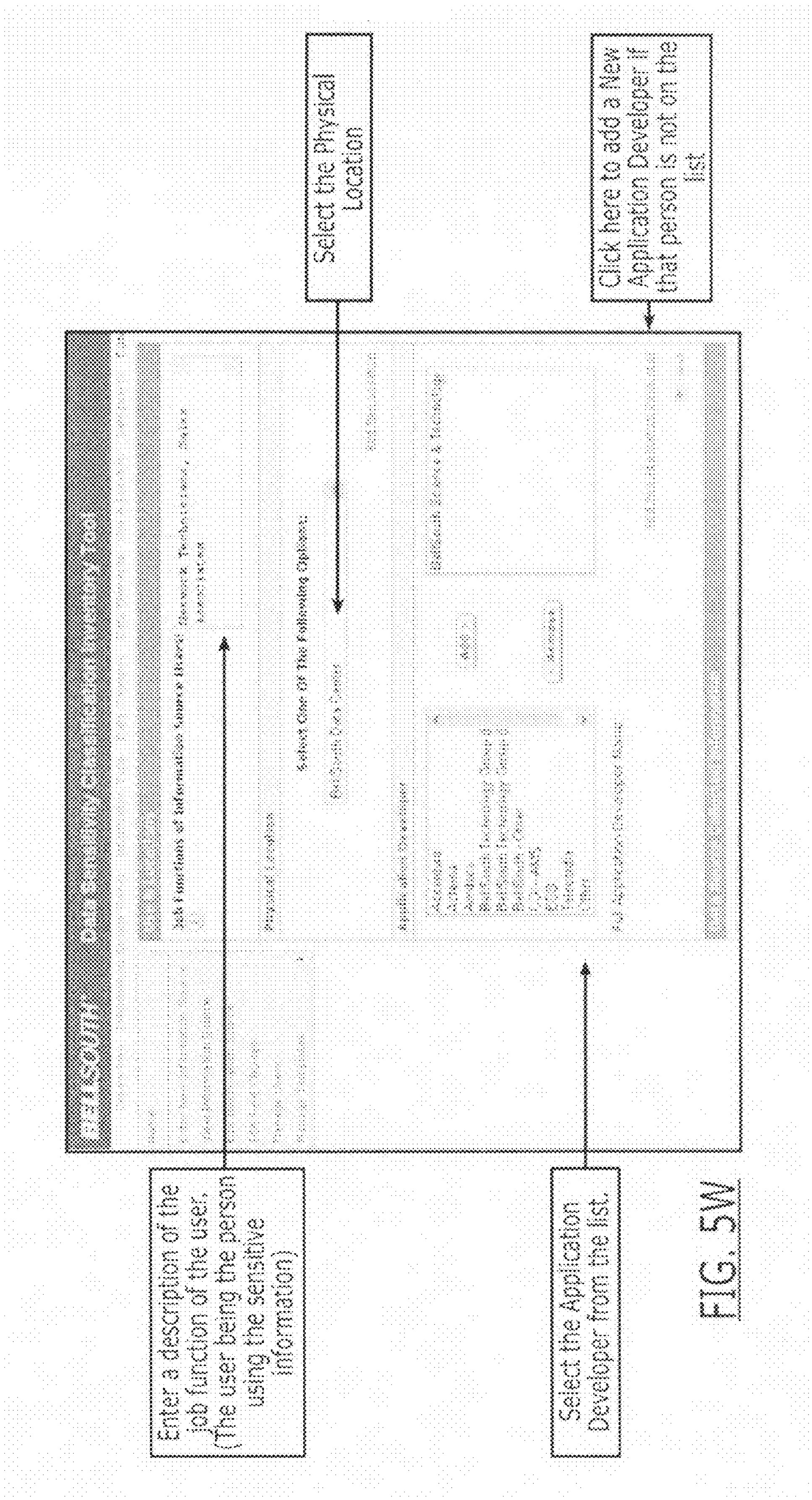
Figure 5X:
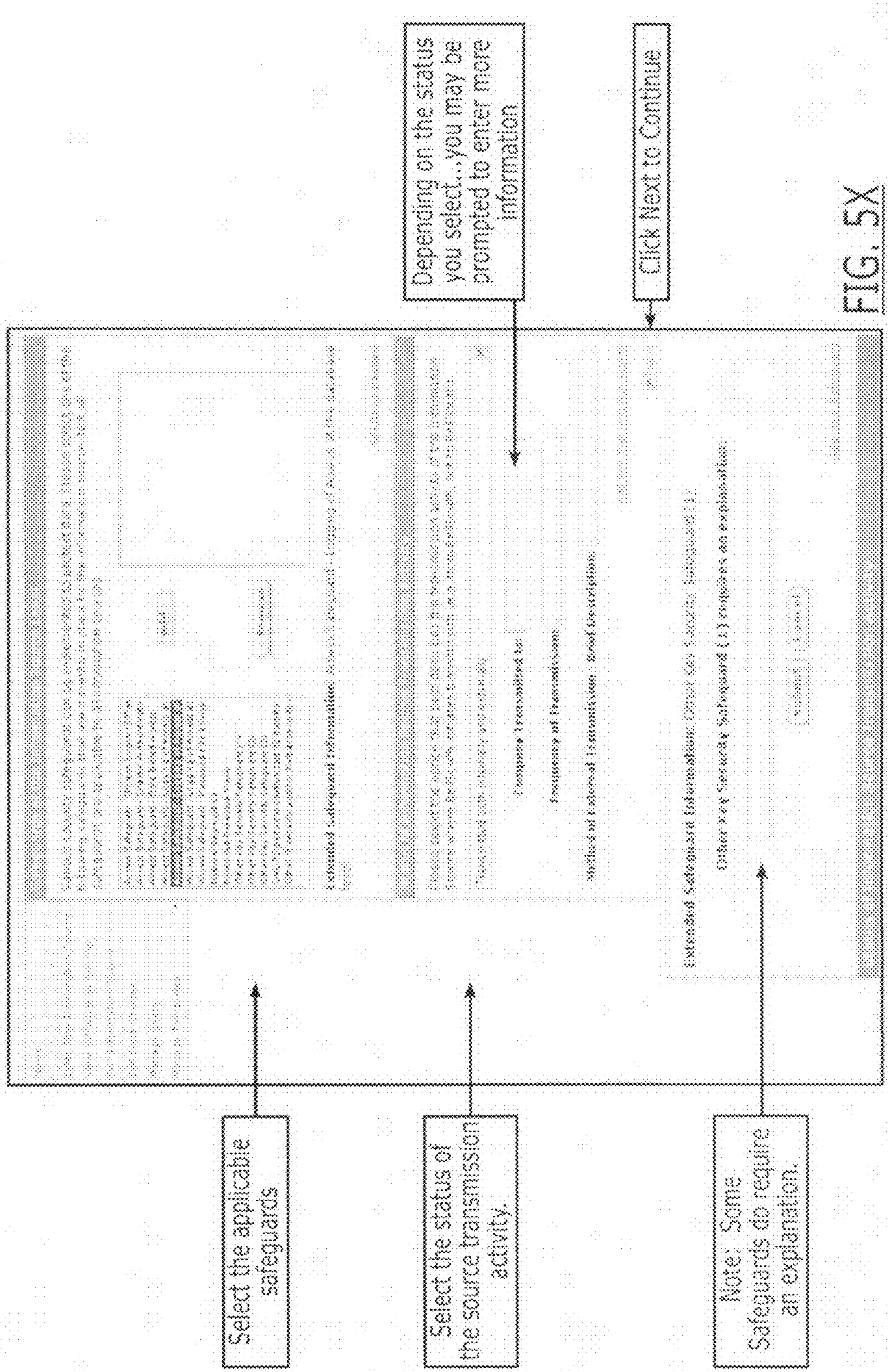
Figure 5Y:
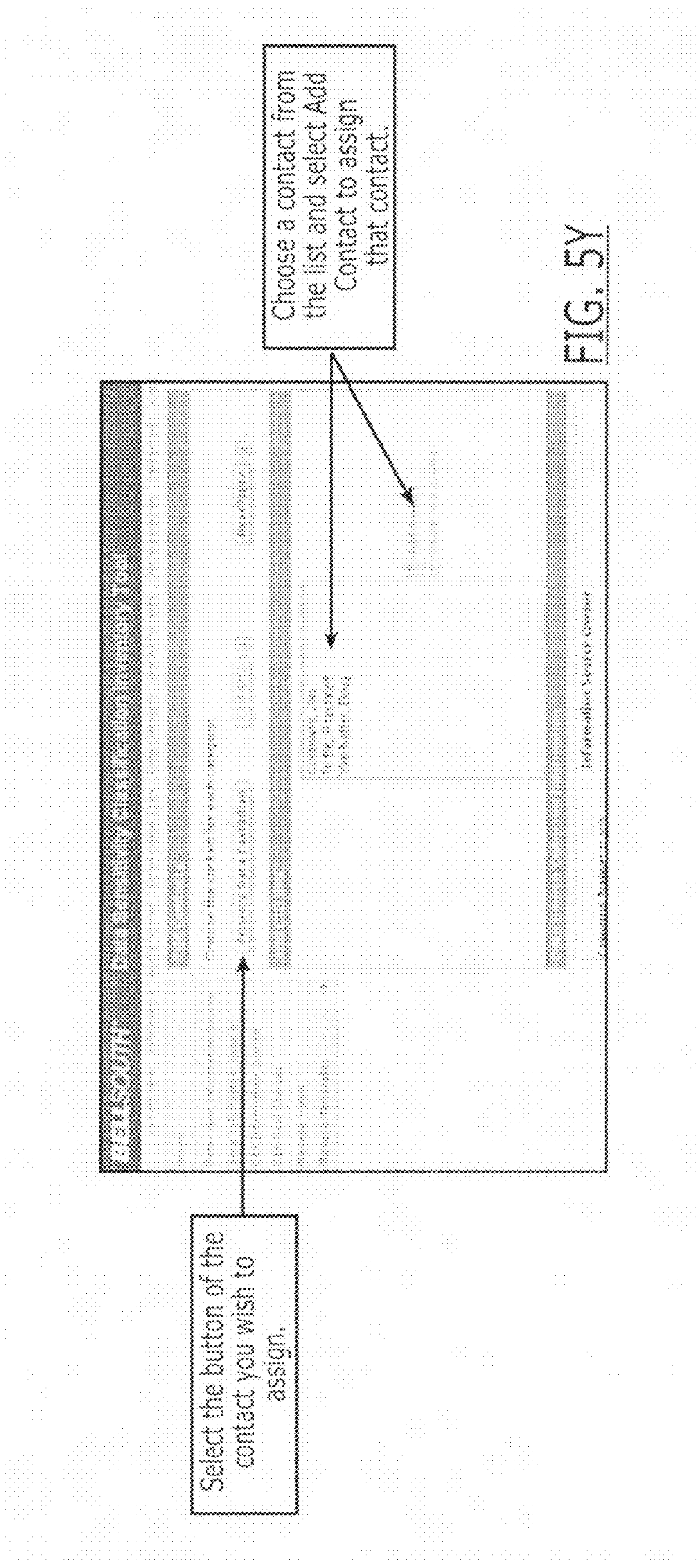
Figure 5Z:
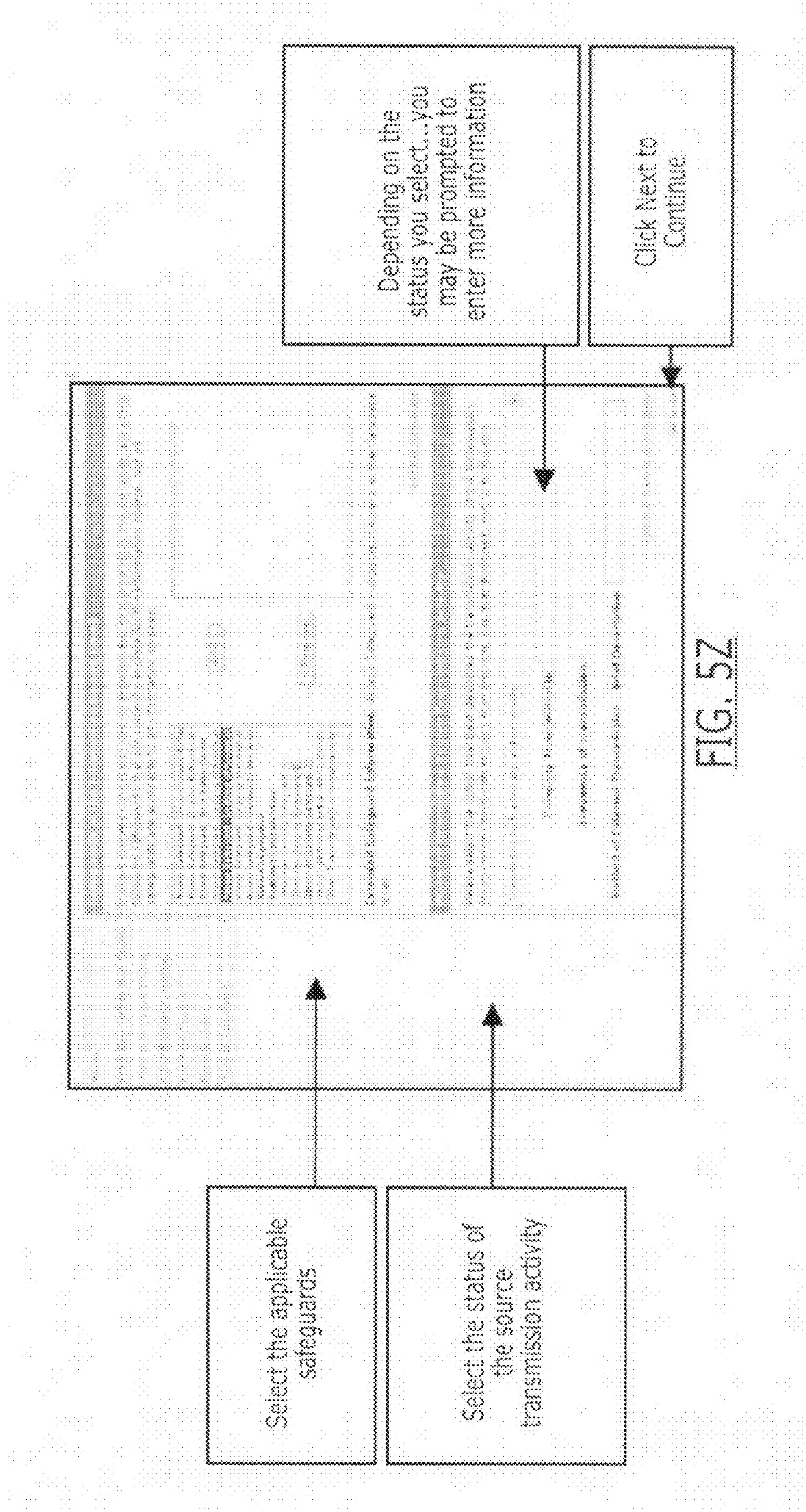
Figure 5A:
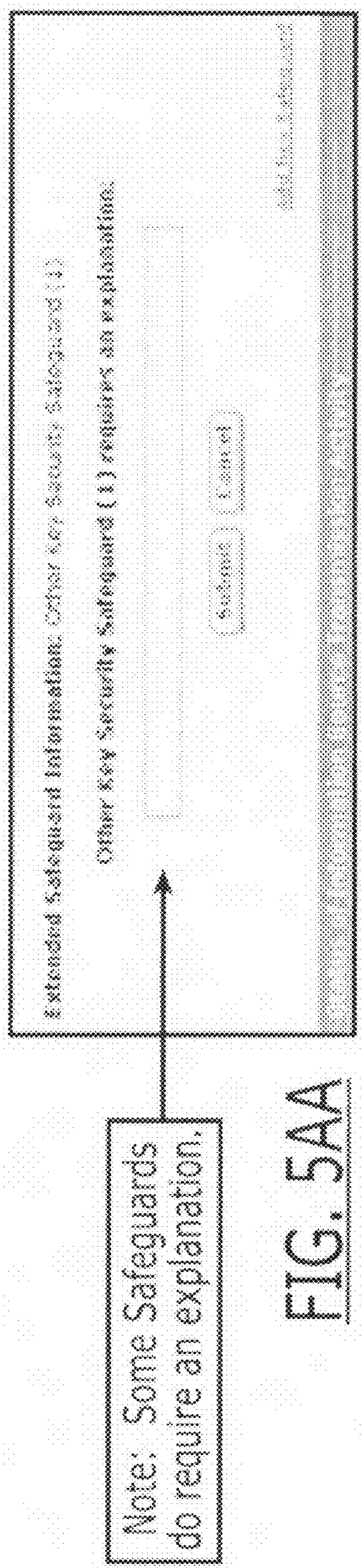
Figure 5B:
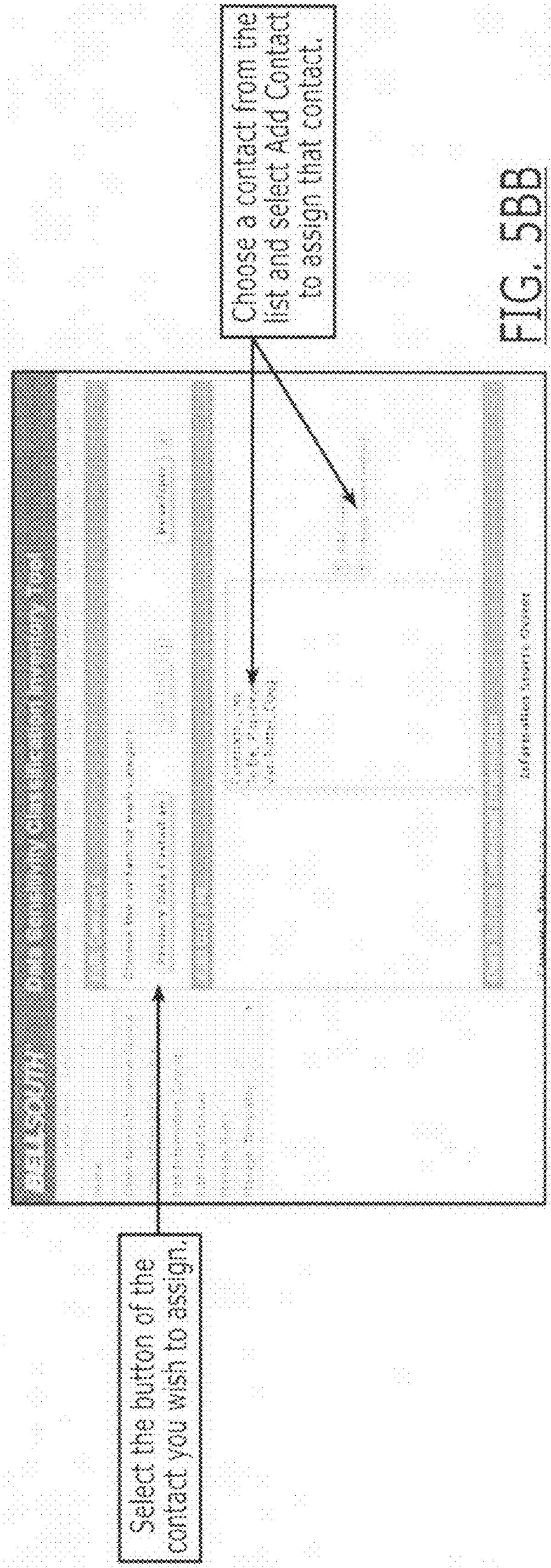
Figure 5C:
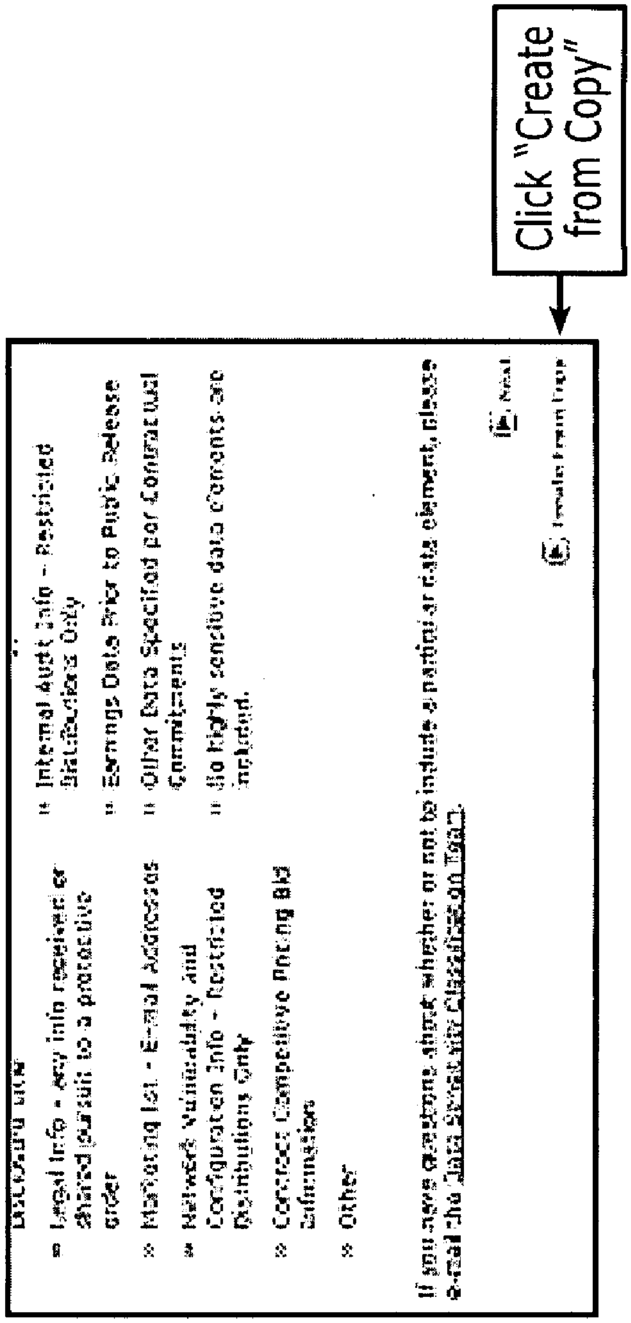
Figure 5D:
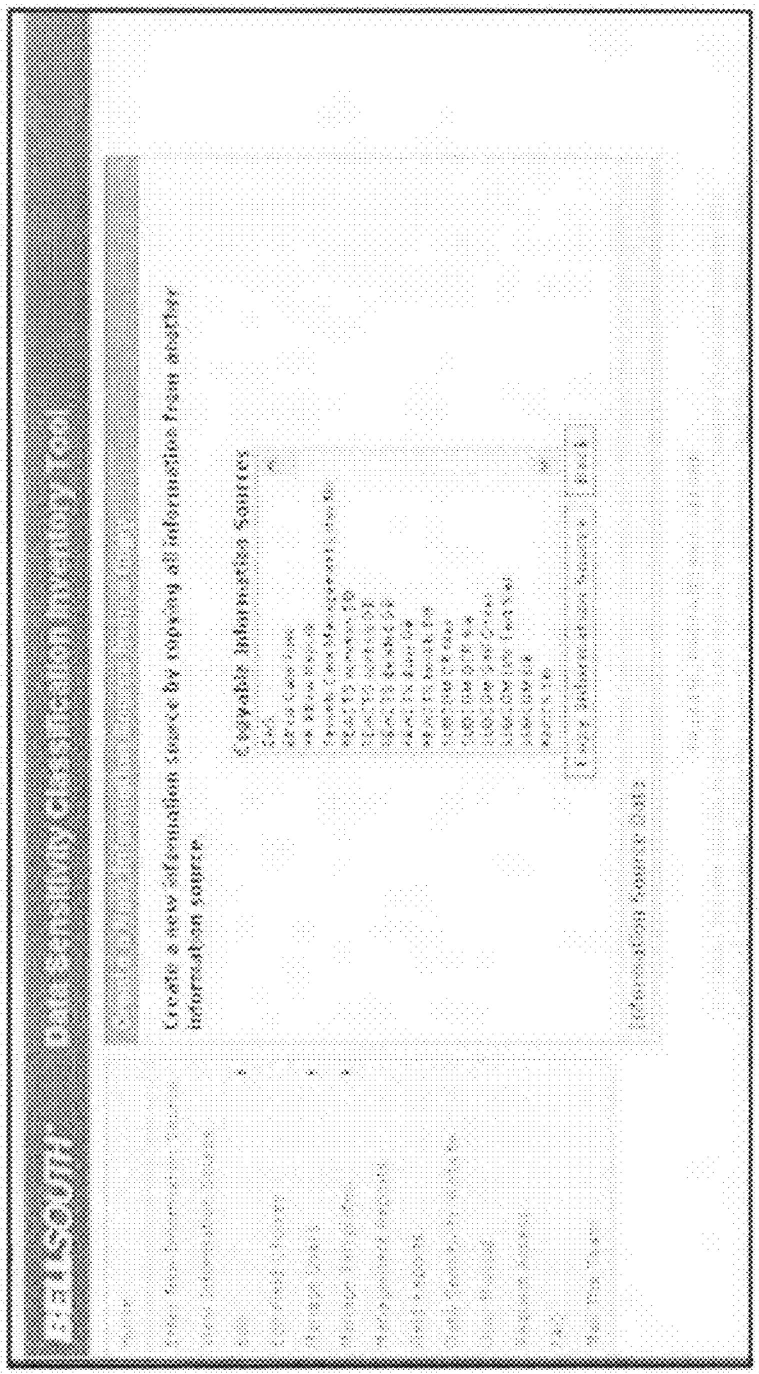
Figure 5E:
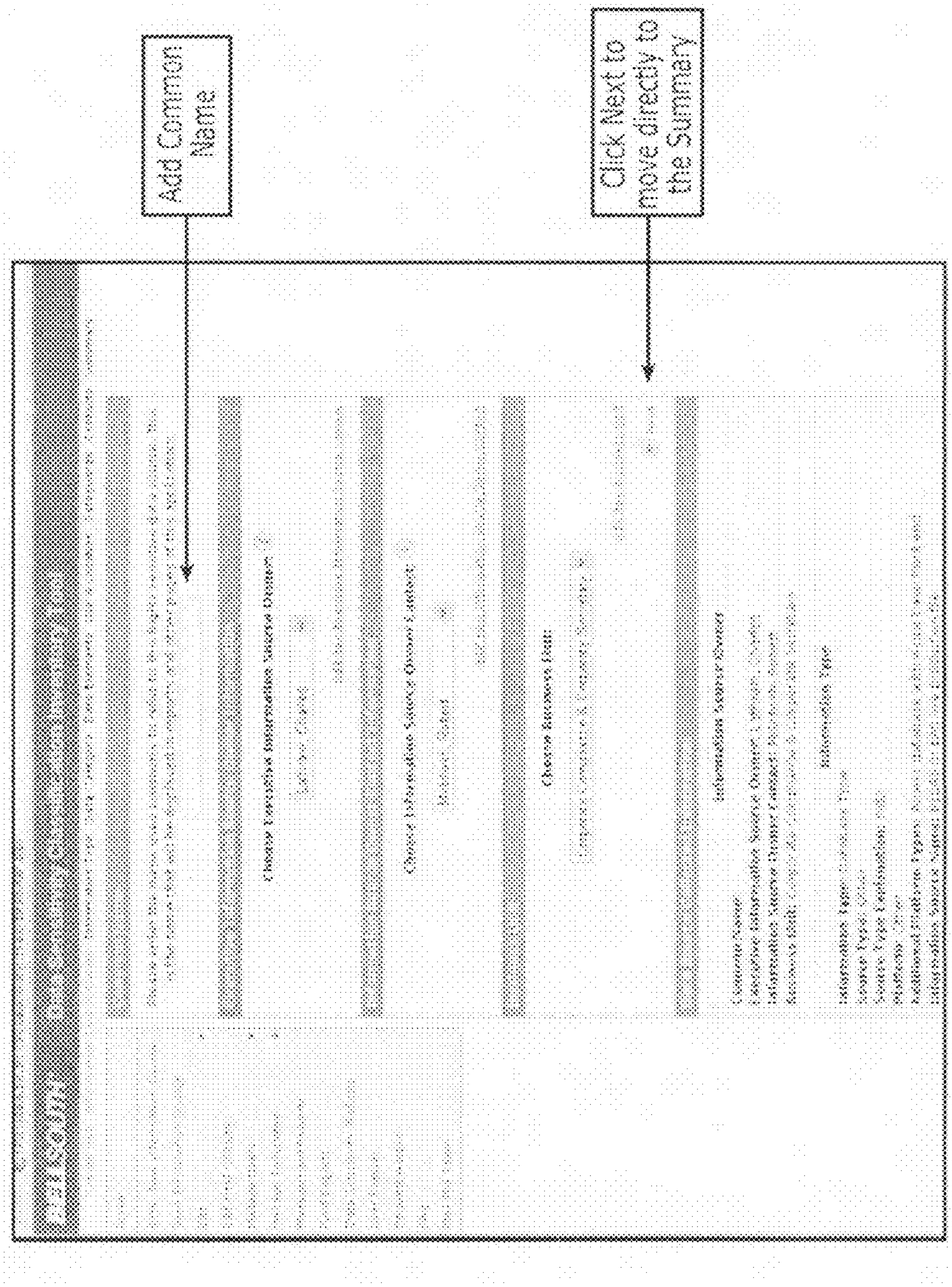
Figure 5F:
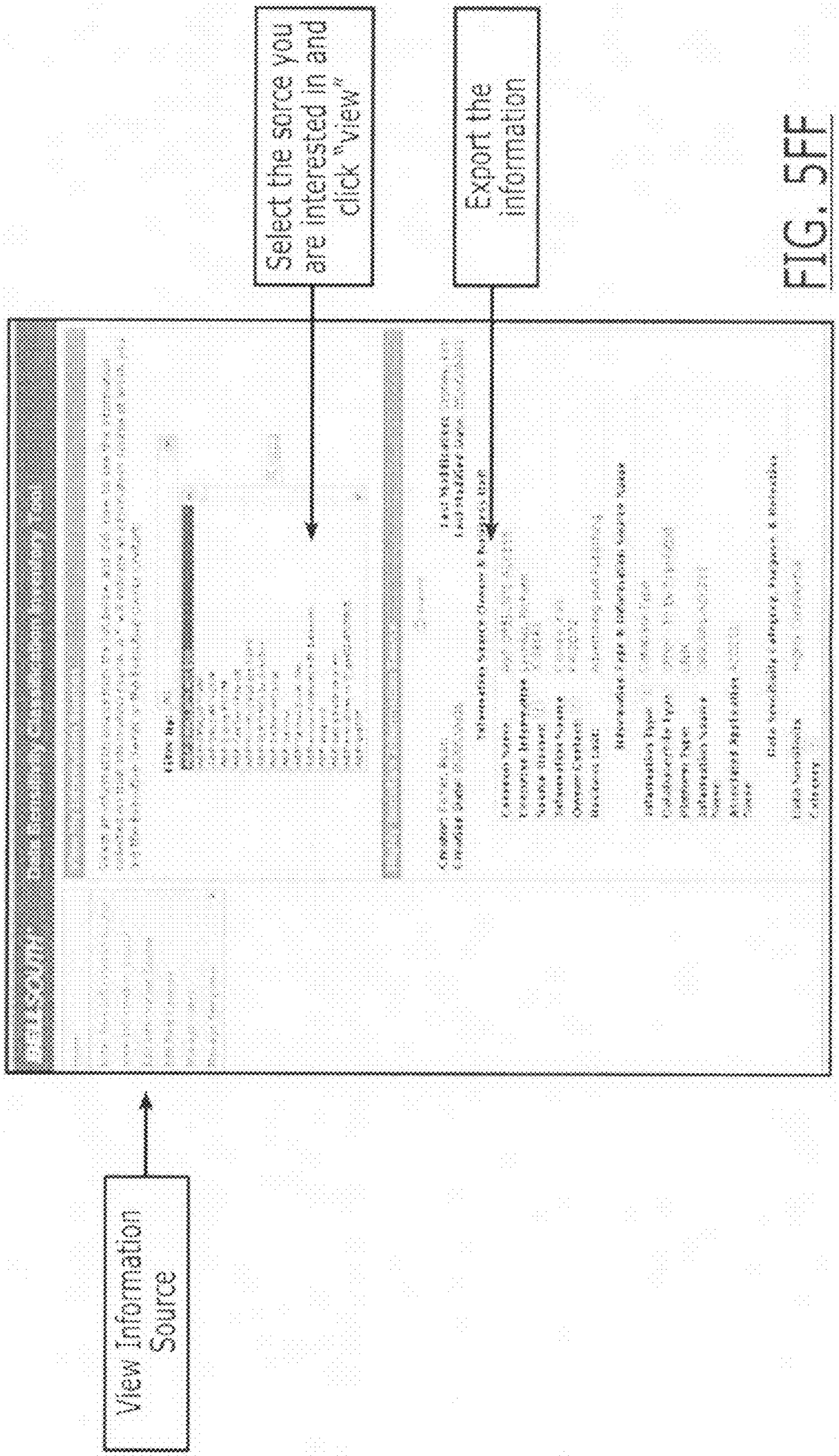
Figure 5G:
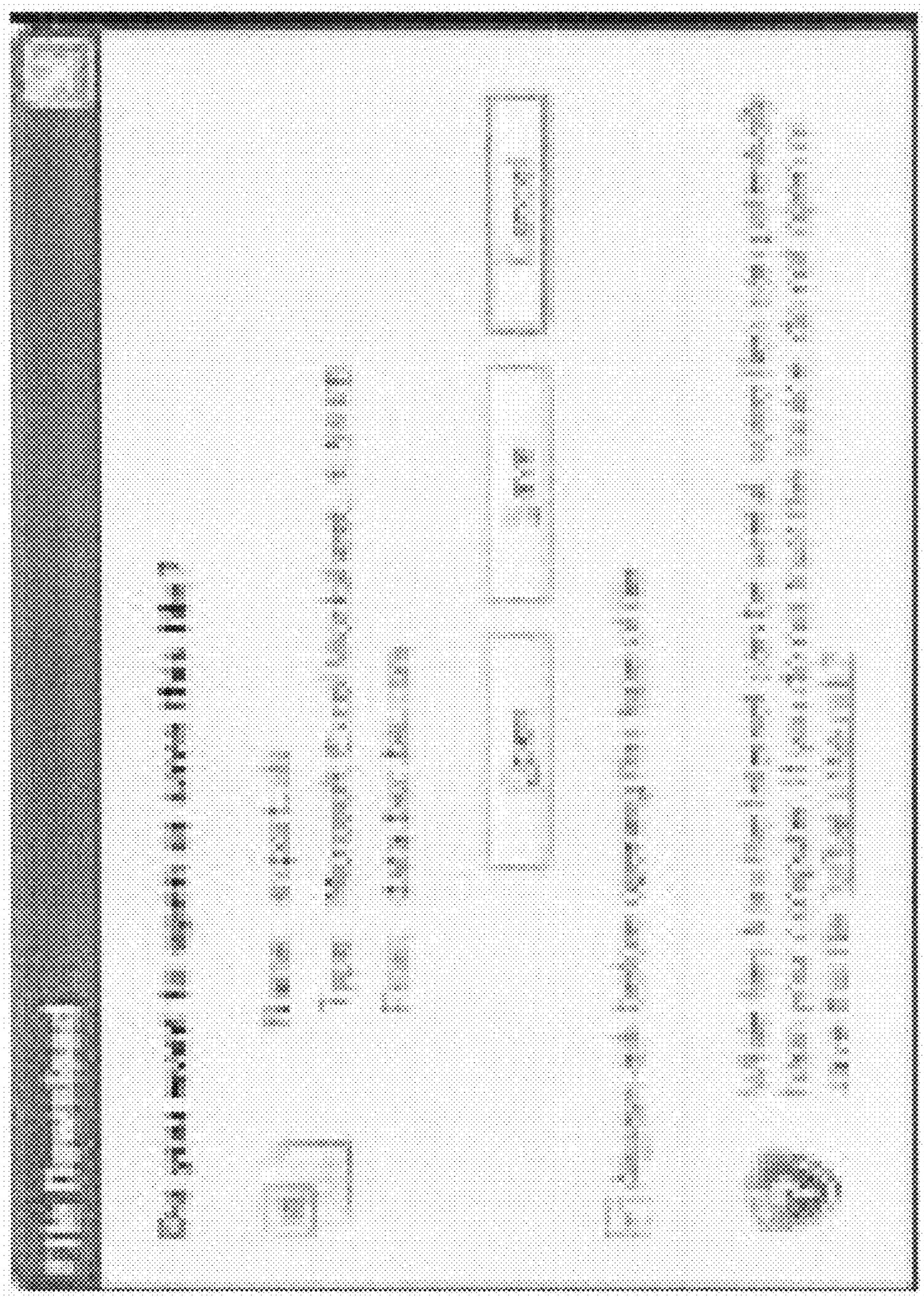
Figure 5H:
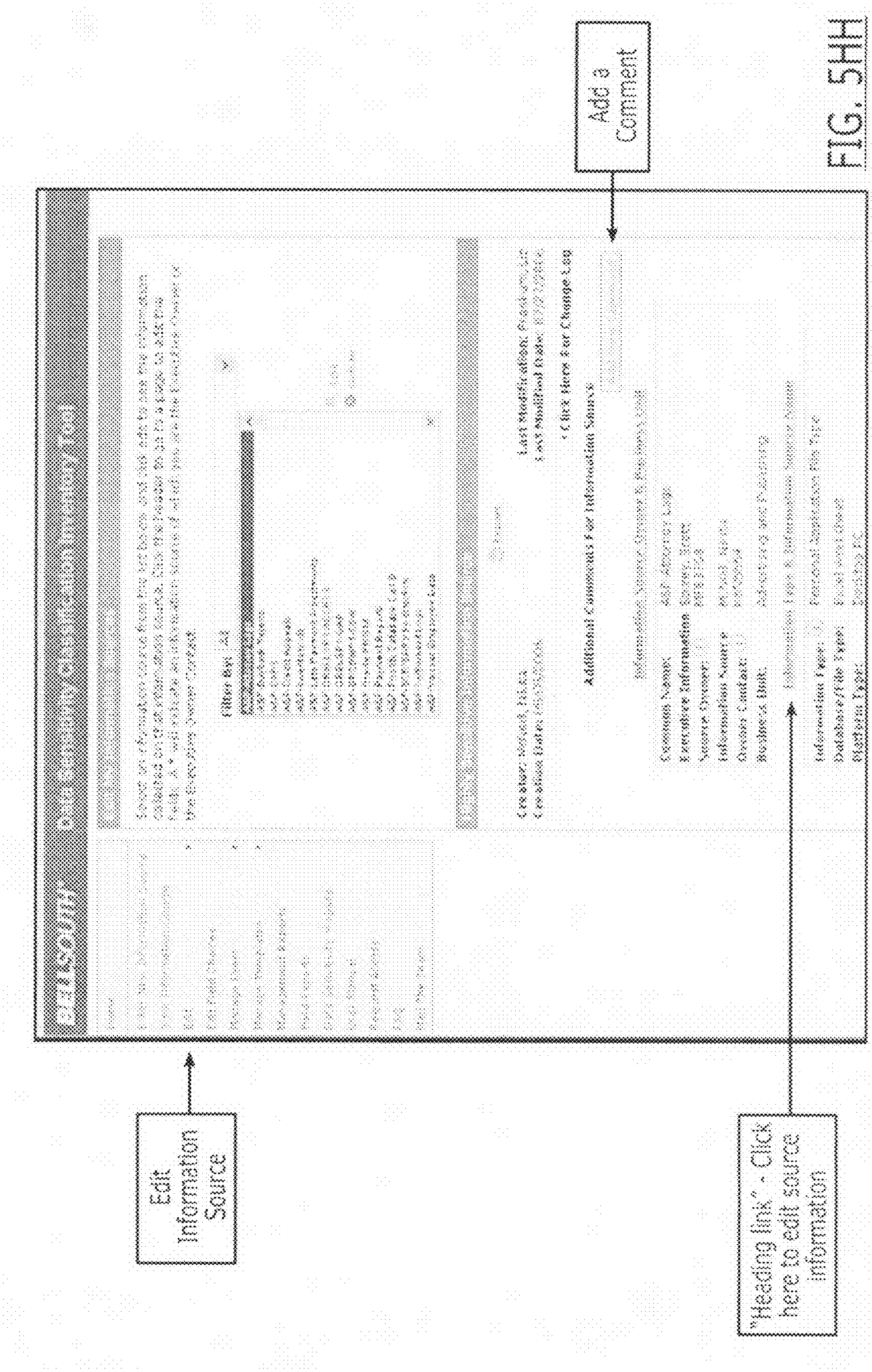
Figure 5I:
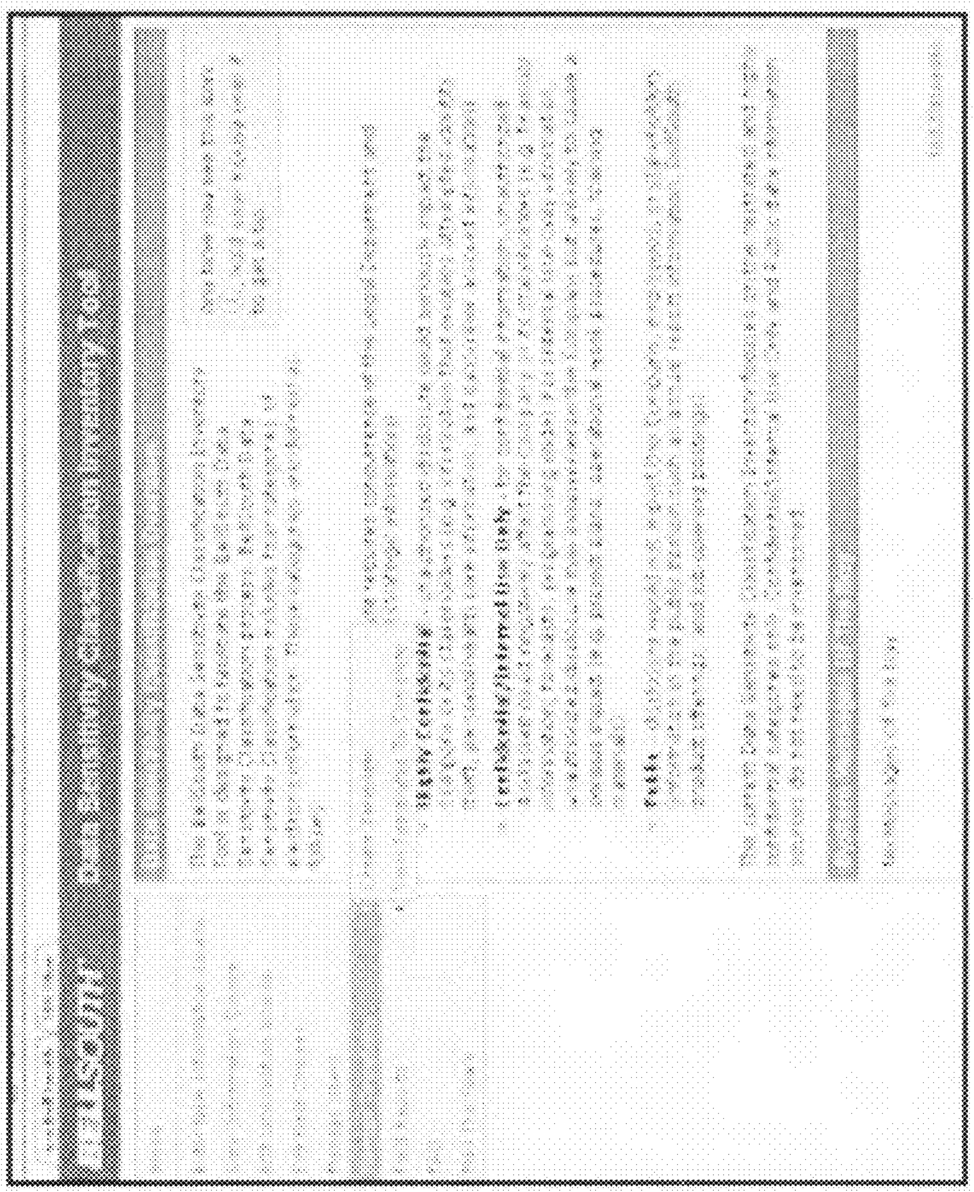
Figure 5J:
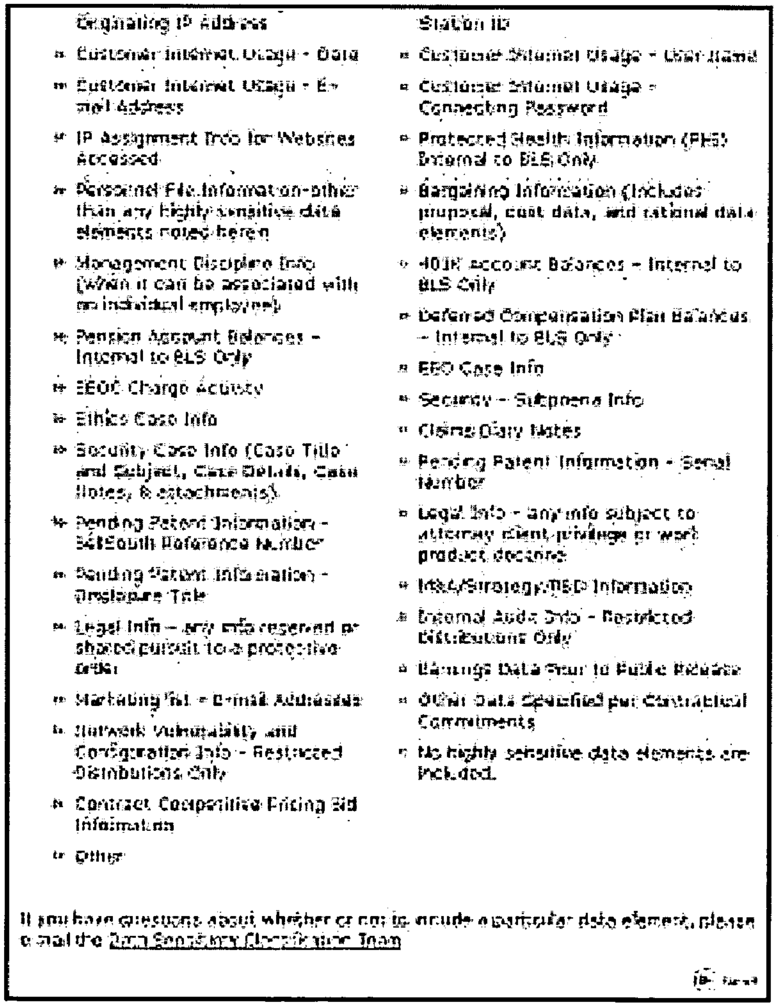
Figure 5K:
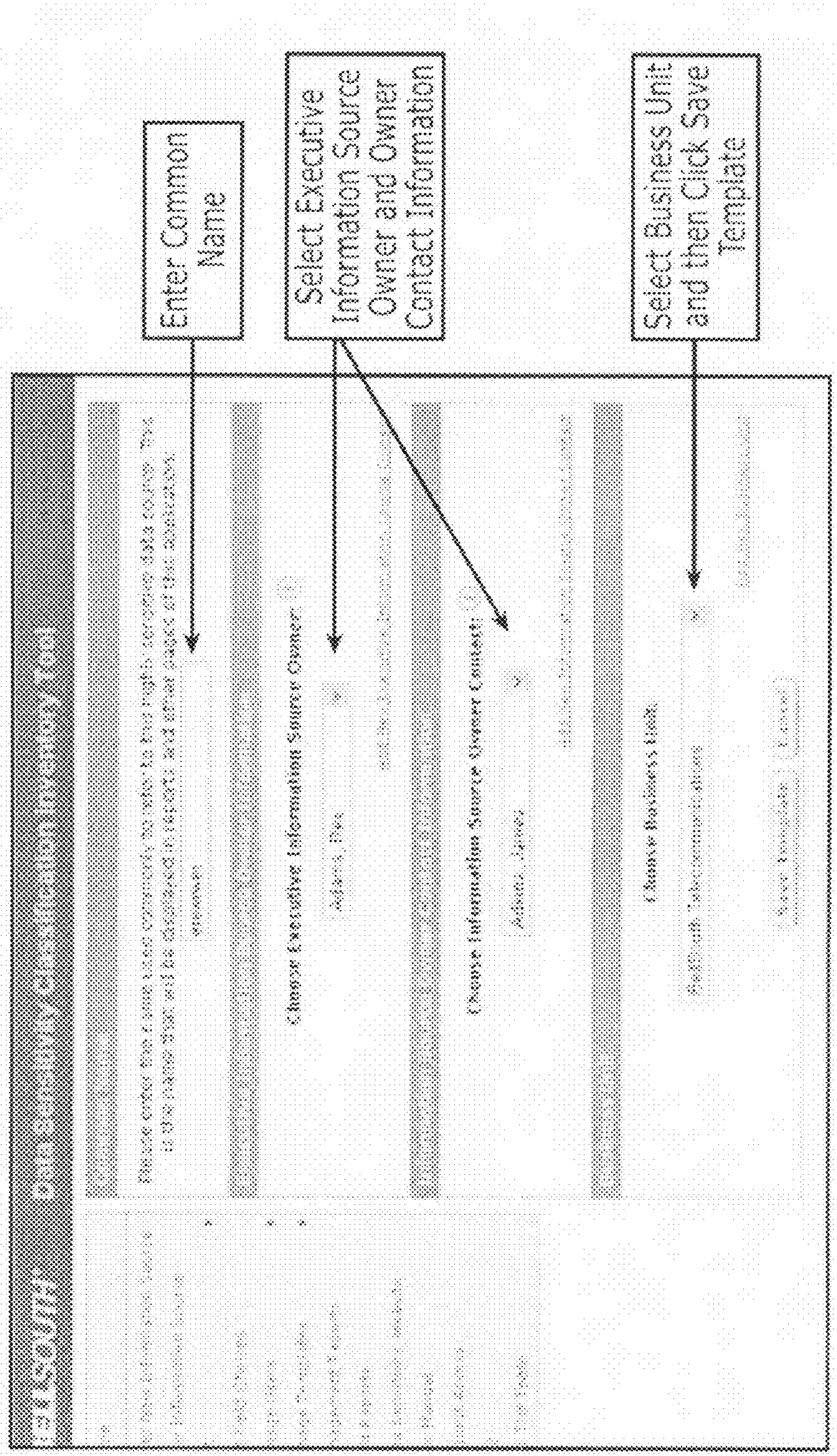
Figure 5L:
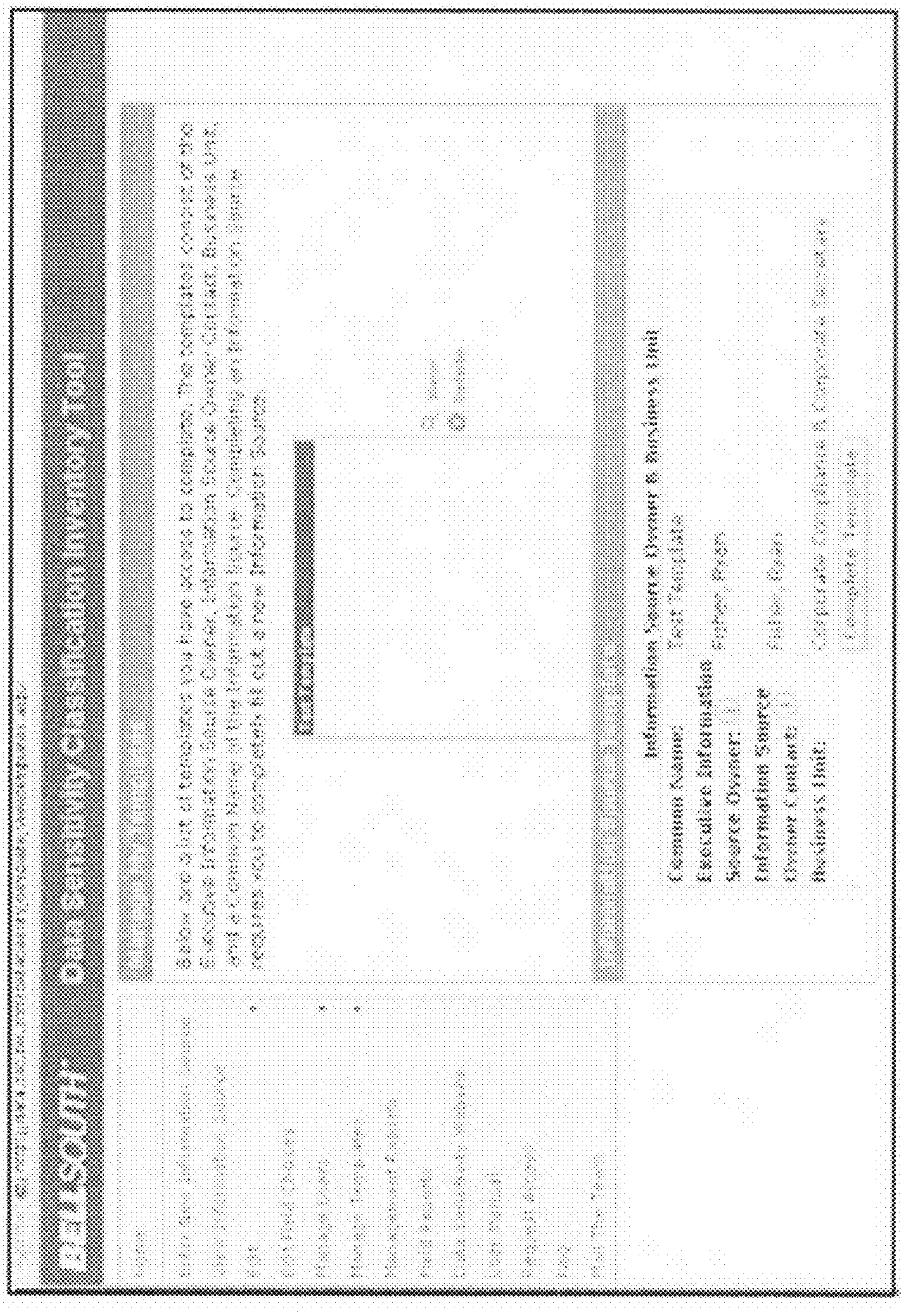
Figure 5M:
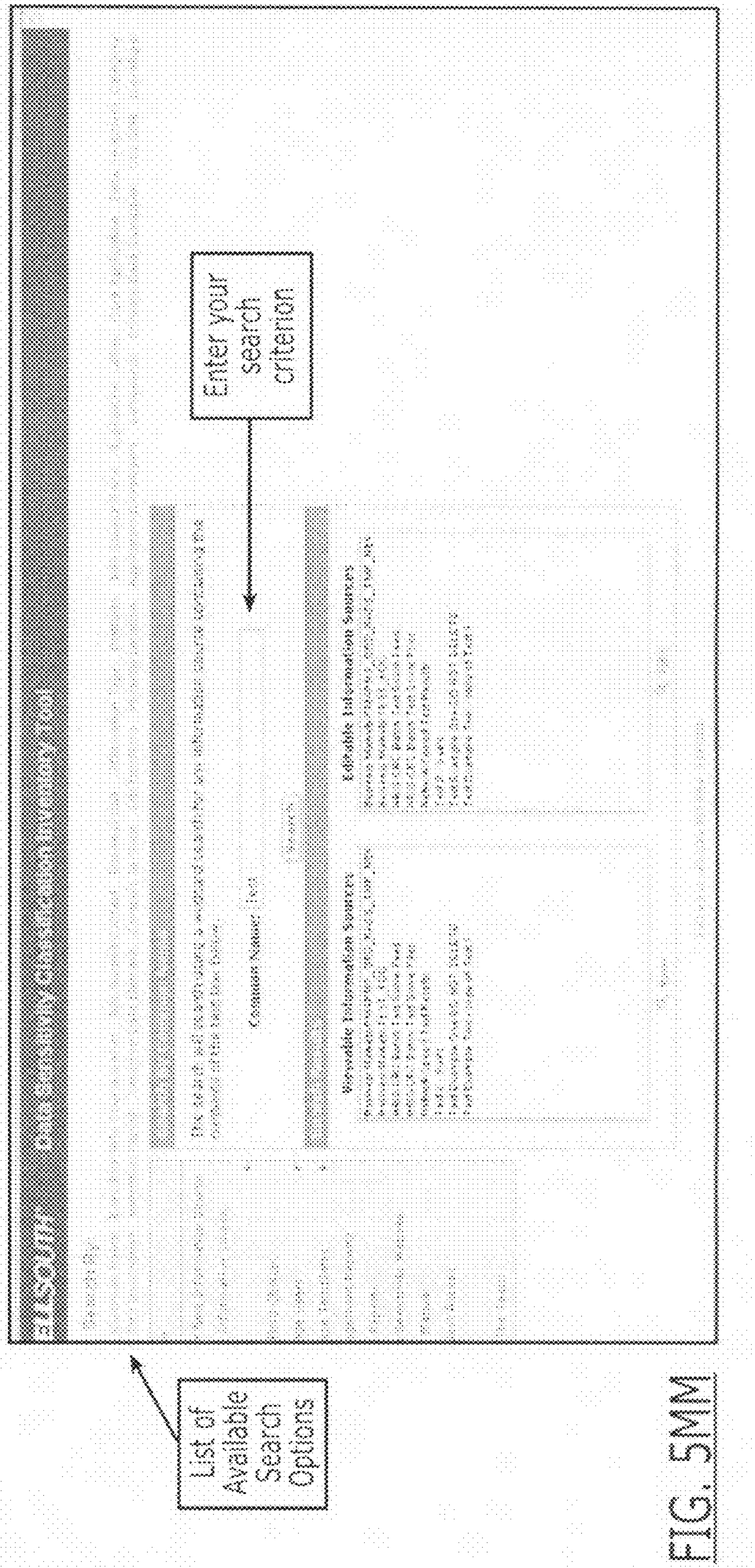
Figure 5N:
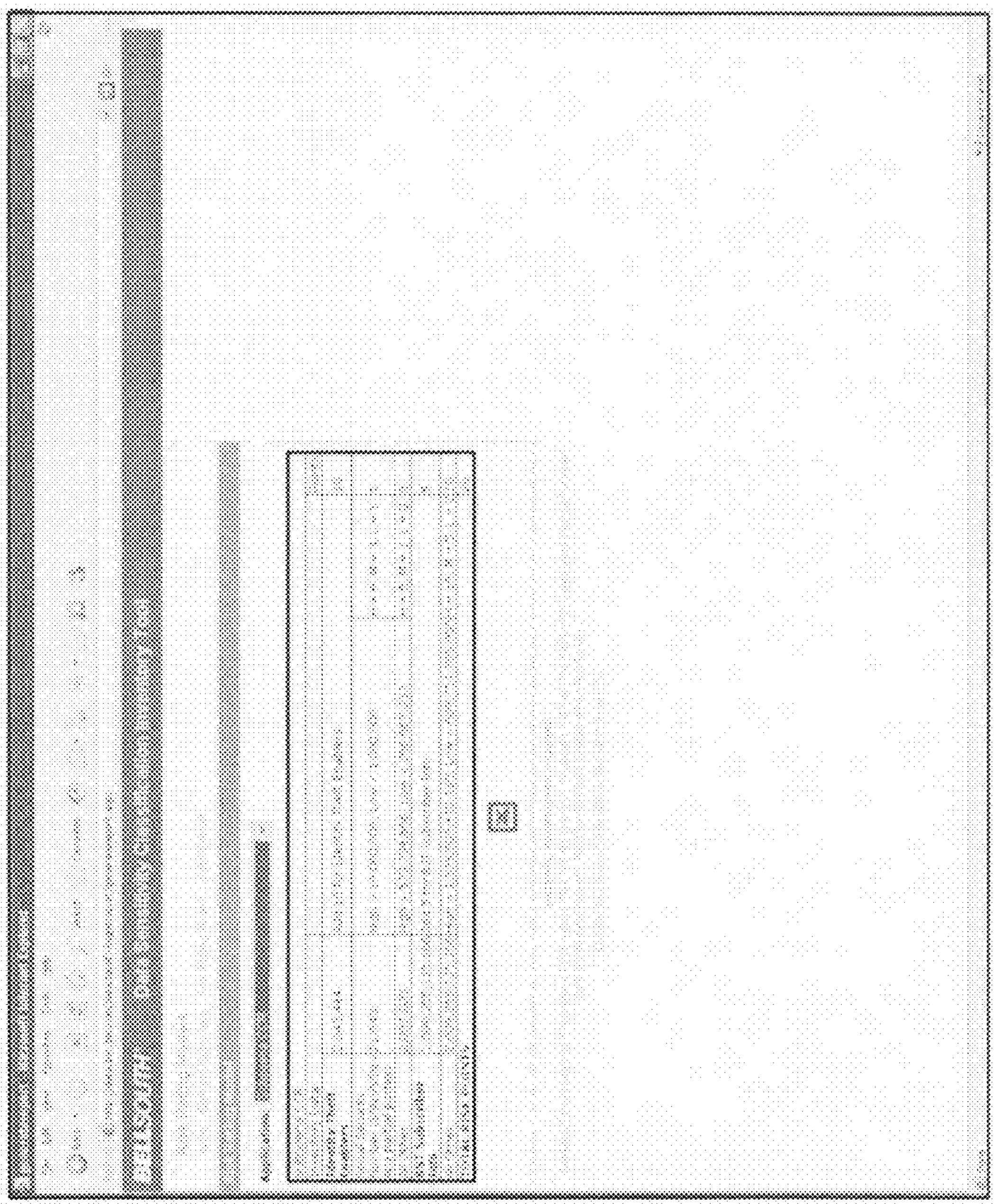

6. Choose the "Executive Information Source Owner" from the drop down menu. This is the individual primarily accountable for this data and should be a Senior Director or above. This is the person who determines the information's value, oversees implementation of appropriate security safeguards, and certifies the accuracy and completeness of data classifications.
7. Choose the "Information Source Owner Contact" from the drop down menu. This person is the primary point of contact for the information source owner.
8. Choose the "Business Unit" from the drop down menu.
9. Then click "Next", as shown in FIG. 5F.
10. The "Next" button appears in the right corner after all fields are populated.
11. Users who can create information sources have the option of adding new "Source Owners and Contacts" by clicking on the link to the right of the text box, as shown in FIG. 5F. These links directs the user to a page similar to FIG. 5G where they can enter the relevant information about the new "Source Owner or Contact." This information will then be displayed in the drop down box, as shown in FIG. 5H.
12. BellSouth Core Application List—FIG. 5I.
13. Select the information "Type" from the drop down menu. The tool currently provides three "types" of information, as shown in FIG. 5J:
    Database Type
    Personal Application File Type
    Server/Mainframe Based File Type
14. Select the "Platform Type" from the drop down menu, as shown in FIG. 5K.
15. Selected Users can add a "platform type" by clicking on the link to the right of the drop down menu.
16. If you choose "Mainframe" from the "Platform Type" drop down menu, be sure to enter the "Main Frame High Level Node (HLN), as shown in FIG. 5L.
17. Enter the Information Source Name, as shown in FIG. 5M:
    Database Instance Name (for midrange databases)
    Dataset Name (for mainframe databases)
    File Name (for personal desktop sources, flat files, job log files, etc.)
18. Select a Data Sensitivity Classification Category, as shown in FIG. 5N.
19. Please briefly describe the type of information included in the information source and the purpose the information is used. See Step-by-Step instructions in FIG. 5O).
20. Choose the classification category, as shown in FIG. 5P. It will be either:
    Restricted: disclosure requires concurrence of the Legal Department and responsible officers (strategic information); or
    Highly Confidential: unauthorized disclosure could seriously impact the Company or its stakeholders (e.g. information that enables attempted identity theft, personal health care information, and subscriber account information).
21. Enter a description of the information and its purpose in the text box shown in FIG. 5Q.
22. Select the Normal Retention Schedule of the data.
23. Enter the name of the litigation or audit requiring suspension.
24. Alter you have entered information into each field, click "Next", as shown in FIG. 5R.
25. Please designate all highly sensitive data elements within the information source previously identified, as shown in FIG. 5S. This list is not intended to be all-inclusive. Please use the "Other" option to identify highly sensitive data elements not explicitly listed.
26. Select Element(s) in the column on the left and add them to the column on the right by clicking the "Add" button, as shown in FIG. 5T.
27. Element(s) can be removed from right column by clicking on the element and clicking the "Remove" button.
28. Enter the number of occurrences of the sensitive data elements within the information source. This number can be a rough estimate and is not intended to be exact. Each element will need an estimate. See FIG. 5U.
29. Select the "Save" button.
30. Enter Use and Location Information.
31. Enter Data Controls in place as shown in FIGS. 5V and 5W. For each Data Element listed with this Information Source, select the controls applied to that element.
32. Click "Next" to continue.
33. Select safeguards that are currently in place for the information source, as shown in FIG. 5X. Note: Not all safeguards are applicable to all information sources.
34. Enter the Contact Information, as shown in FIGS. 5Y and 5Z.
35. You will be directed to a site which summarizes the Information Source. See FIG. 5AA.
36. Note: The screen shot of FIG. 5AA is of the same page. The left picture is of the top of the page, and the right picture is of the bottom of the site.
37. Review the entries you made and click "Save Information Source".
38. You will see the notice of FIG. 5BB before being redirected to the home page.

3.2.2 Creating an Information Source from a Copy

39. Scroll to the bottom of that page and click "Next" or "Create from Copy", as shown in FIG. 5CC.
40. Choose Information Source, as shown in FIG. 5DD.
41. Add New Common Name, Click on Next, Can now move directly to Summary, as shown in FIG. 5EE.

3.3 Viewing an Information Source

1. Choose View Information Source from the menu on the left side of your screen, as shown in FIG. 5FF.
2. Select an information source from the list below and click view to see the information collected on that information source.
3. Note: A * will indicate an information source of which you are you are the Executive Owner or the Executive Owner Contact.
4. Click Export to export the information. The screen of FIG. 5GG will appear and you will have the option of opening the source in Excel or saving it to your computer.
5. If you save to your computer, be sure to specify where you are saving the file and name the file.

3.4 Editing an Information Source

1. Choose Edit from the menu on the left side of your screen, as shown in FIG. 5HH.
2. Select an information source from the list of FIG. 5HH and click "edit" or "delete" to see the information collected on that information source.
3. If you click "Edit," the information source summary will appear and you can click the heading link to edit a particular category of information.

3.5 Manage Templates

1. Select Manage Templates from the menu of FIG. 5II.
2. Create a Template, as shown in FIGS. 5JJ, 5KK and 5LL.

3.6 Field Reports

1. This menu provides a variety of search options.
2. Click the field name you want to search by, enter your search criterion, and click Search, as shown in FIG. 5MM.

Many variations of the above-described embodiments may be provided according to other embodiments of the present invention, for example by providing additional fields and/or drop-down boxes, as will now be described in detail. In particular, BellSouth Data Sensitivity Classification includes four categories of electronic information These categories are defined as follows:

- Restricted—disclosure requires concurrence of the Legal Department and responsible officers (e.g. strategic information)
- Highly Confidenial—unauthorized disclosure could seriously impact the Company or its stakeholders (e.g. information that enables attempted identify theft, personal health information, and subscriber account information)
- Confidential/Internal Use Only—for confidential information, unauthorized disclosure could negatively affect the Company or its stakeholders (e.g. financial information; forecasts; programming code). For Internal Use Only information, unauthorized disclosure may inconvenience the Company but unlikely to cause a serious impact (e.g. project plans; operational work procedures; training materials)
- Public—disclosure would not impact the Company, employees, or stakeholders (information in the public domain such as annual report information, BellSouth product offerings, and job opening postings)

Some embodiments may provide a field label "The Current Data Sensitivity Classification Inventory focuses on the restricted and highly confidential categories only. Confidential/Internal Use Only and Public data information sources do not need to be inventoried."

Some embodiments may provide screen label "Current Data Sensitivity Classification Requirements".

This inventory is to be completed for any mechanized information source that contains Highly Sensitive Data Elements. A separate inventory record should be created for each information source. Each duplicate or archived copy of files for personal/departmental use should be included in the inventory as a separate information source. For example, if highly sensitive data elements are located in a database and copies or extracts are created in other files, one inventory record would be provided for the database and another inventory record for the set of files. If highly sensitive data fields are transmitted via another set of files to or from other applications, then a third inventory record would be provided for those transmitted files.

In many cases, it is practical to group hundreds or thousands of files in one line item. This may be used if each file grouped has similar content; including the same number of occurrences of the same highly sensitive data elements, and safeguards (controls) are the same for all the files in the group. When files are grouped, please name the file grouping something descriptive enough so that someone other than the people currently completing the inventory would understand what files are included by reading the name. In some cases, grouped files may have a portion of the file name in common, so that partial file name would be an adequate group name. Other examples include using a path or directory name that the files have in common, or creating a descriptive name that describes what the files are (e.g. XXXXX Daily Transaction Files)

The current Data Sensitivity Classification Inventory scope does not include:

- Files generated during official corporate automated backup processes
- Disaster recovery copies
- Files stored for less than 24 hours
- Individual tables within a database
- SFMI (Storage Forward Messaging Infrastructure) or other middle ware functionality.

Information for the following highly sensitive elements may be required. This list is not all-inclusive, but is meant to facilitate the completion of the Data Sensitivity Classification Inventory. Each data owner is responsible for identifying and completing the following inventory for all the highly sensitive data elements that meet the restricted or highly confidential definitions.

- Social Security Number (SSN)
- SSN—Any partial portion
- CUID
- Driver's License Number
- State Issued ID Card Number
- Personal Bank Account Number
- Corporate Bank Account Number
- Positive Pay Information—Check #/Payee/Amount collectively
- Bank Routing # with bank account #
- Corporate Credit Card Number
- Personal Credit Card Number
- Debit Card Number
- Account Passwords or PINs
- Consumer Credit Report
- Stored Password Hint Answers
- Biometrics Scanned Image
- Calling Card Number
- Salary Info—Other Paycheck Data
- Salary Info—Other Employment Data
- Salary Info—Other Personal Data
- Customer Call Detail—Originating Call #
- Customer Call Detail—Terminating Call #
- Customer Call Detail—Date of Call
- Customer Call Detail—Time of Call
- Customer Call Detail—Duration of Call
- Other Contacts & ID Codes
- Unpublished Service Addresses
- Unpublished Phone Numbers Discreetly Identifiable and Associated with Owner
- Unpublished Phone Numbers NOT Discreetly Identifiable or Cannot be readily Associated with Owner
- Customer Bill Dollar Amount Components
- Customer Internet Usage—Originating IP Address
- Customer Internet Usage—Calling Station ID
- Customer Internet Usage—Date
- Customer Internet Usage—User Name
- Customer Internet Usage—E-mail Address
- Customer Internet Usage—Connecting Pword
- IP Assignment Info for websites accessed
- Protected Health Info (PHI)
- Personnel File Info-other than any highly sensitive data elements noted herein
- Bargaining Info (includes proposal, cost data, and rational data elements)
- Management Discipline Info (when it can be associated with an individual employee)
- 401K Account Balances
- Pension Account Balances
- Deferred Compensation Plan Balances
- EEOC Charge Activity EEO Case Info
Ethics Case Info
Security—Subpoena Info
Security Case Info (Case Title and Subject, Case Details, Case Notes, & attachments)
Claims Diary Notes
Pending Patent Info—BellSouth Reference #
Pending Patent Info—Serial Number
Pending Patent Info—Disclosure Title
Legal Info—any Info subject to attorney client privilege or work product doctrine
Legal Info—any Info received or shared pursuit to a protective order
M&A/Strategy/R&D Info
Marketing list—e-mail addresses
Internal Audit Info—Restricted Distributions Only
Network Vulnerability and Configuration Info—Restricted Distributions Only
Other Data Specified per Contractual Commitments
Other 1. Some embodiments may provide a header label "information Type". Select only one from the following options using option button functionality:

Database Type
Personal Application File Type
Server/Mainframe Based File Type

Each option should have help screen right mouse button click functionality. Help screen verbiage should include:

For database type "The information is stored in a standalone database".
For Personal Application File Type: "Information is stored in an application file, where that application resides on your desktop (e.g. Excel worksheet, Word document, Access database, Adobe.pdf file, Screen-scraping, e-mail, pager, downloads from other applications)"
For Server/Mainframe Based File: "Information stored in a file resident on a server (including personal or shared network drives) or mainframe operating system."

2a. Each option should have drop down box. Drop down selections may be as follows:

For database type:
- Oracle
- Sybase
- Dbase 4 tables
- Essbase
- Informix
- MicroSoft Access
- MicroSoft SQL Server
- IMS
- DB2 on mainframe (zOS)
- DB2 on midrange (UNIX, Windows—also known as DB2 UDB EPE)
- NCR Teradata
- Other For "Other" selection, some embodiments may provide a required 50 character text box to be completed only if option is selected.

2b.

For Personal Application File Type:
- Excel worksheet
- Word document
- Access database
- Adobe.pdf file
- Screen-scraping
- E-mail
- Pager
- Downloads from other applications
- Other 2c.

For Server/Mainframe Based File Type:
- Mechanized output reports (including job files written to system logs such as Syslog Archive Retrieval (SAR)
- Flat files
- Desktop application files residing on personal or shared network drive
- Other For "Other" selection, some embodiments may provide a required 50 character text box to be completed only if option is selected. Add field label "Please list additional operating system file types."

3. Some embodiments may provide a field label "Platform Type" with drop down box selection as follows:

Desktop PC
Mainframe
UNIX
Wintel Server
Other

For "Other" selection, some embodiments may provide a required 50 character text box to be completed only if option is selected. Some embodiments may provide field label "Please list additional Platform Types."

For Mainframe, some embodiments may provide a required 25 character text field labeled "Mainframe HLN".

Some embodiments may provide a header label "Information Source Name".

4. Some embodiments may provide a field name label "Database Instance, Dataset, or File Name". Length of field is 50 characters. This may be a required field.

"File Name" should have help screen right mouse button click functionality. Help screen verbiage should state "If files are too numerous to list individually, please use a name to describe the set of files grouped on one role. Examples include Daily Transaction files, or Complaint Files by Customer Name."

5. Some embodiments may provide a field name label "Associated Application Name (if applicable)". Length of field is 30 characters.

6. Some embodiments may provide a field name label "Aliases (if applicable)". Length of field is 50 characters. "Aliases (if applicable)" should have help screen right mouse button click functionality. Help screen verbiage should state "Enter any additional name used by the Business Unit, BellSouth Technology Group, Accenture, EDS, or another vendor.

Some embodiments may provide a screen label "Data Sensitivity Classification Categories".

Some embodiments may provide Contents below:

Restricted—disclosure requires concurrence of the Legal Department and responsible officers (e.g. strategic information)
Highly Confidential—unauthorized disclosure could seriously impact the Company or its stakeholders (e.g. information that enables attempted identify theft, personal health information, and subscriber account information)
Confidential/Internal Use Only—for confidential information, unauthorized disclosure could negatively affect the Company or its stakeholders (e.g. financial information; forecasts; programming code). For Internal Use Only information, unauthorized disclosure may inconvenience the Company but unlikely to cause a serious impact (e.g. project plans; operational work procedures; training materials)

Public—disclosure would not impact the Company, employees, or stakeholders (information in the public domain such as annual report information, BellSouth product offerings, and job opening postings)

Some embodiments may provide a field label "The Current Data Sensitivity Classification Inventory focuses on the restricted and highly confidential categories only. Confidential/Internal Use Only and Public data information sources do not need to be inventoried."

7. Some embodiments may provide an option box with the following options:

Restricted

Highly Confidential

Some embodiments may provide a label that states "Note: If data source meets both categories based on the help criteria given, please select restricted.

Note: Whenever options are listed, include capability for tool administrator to add additional options.

"Restricted" should have help screen right mouse button click functionality. Help screen verbiage should display "Select Restricted if (1) paper copy output from mechanized sources are numbered and controlled (2) originating department approves before sharing with third party and/or (3) Legal approval is required prior to disclosure outside BellSouth."

"Highly Confidential" should have help screen right mouse button click functionality. Help screen verbiage should display "Select Highly Confidential if the information source contains personal information which could result in an invasion of privacy potentially resulting in damages against BellSouth. Examples include but are not limited to (1) information facilitating identify theft or (2) personal information such as call details, internal investigations (e.g. Security or Ethics cases), or (3) information that could result in law suits or loss of legal rights (e.g. patent applications)."

8. Some embodiments may provide a field name label "Information Description/Purpose".

Some embodiments may provide a field label "Please briefly describe the type of information included in the information source and the purpose the information is used."

For the "Information Description/Purpose" field, some embodiments may provide a required 150 character text box to be completed.

9. Some embodiments may provide a header field label "Time Period Data is Normally Retained in Information Source".

Some embodiments may provide a field label "Current +" with option to either select or not select Add one numeric field with choices of 1-365, and 999.

Numeric field and related drop down box should have help screen right mouse button click functionality. Help screen verbiage should state "Select time period normally retained. If "permanent", please enter "999" in the numeric field.

Some embodiments may provide a drop-down box beside numeric field with the following choices:

Hours

Days

Weeks

Months

Years

Permanent

"Time Period Data is Normally Retained in Information Source" should have help screen right mouse button click functionality. Help screen verbiage should state "Enter the time period the information is kept at the current time. If the information source record retention is currently suspended for legal reasons, please indicate normal record retention when the suspension is lifted."

9a. Some embodiments may provide a field label "If record retention is currently under suspension (permanent hold) for legal reasons, please enter name of litigation or audit requiring suspension (permanent hold)".

Some embodiments may provide a 30 character text field.

10. Some embodiments may provide a screen label "Highly Sensitive Data Elements".

Some embodiments may provide a screen label "Please designate all highly sensitive data elements within the information source previously identified. This list is not intended to be all inclusive. Please use the "Other" option to identify highly sensitive data elements not explicitly listed."

Social Security Number (SSN)
SSN—Any partial portion
CUID
Driver's License Number
State Issued ID Card Number
Personal Bank Account Number
Corporate Bank Account Number
Positive Pay Information—Check #/Payee/Amount collectively
Bank Routing # with bank account #
Corporate Credit Card Number
Personal Credit Card Number
Debit Card Number
Account Passwords or PINs
Consumer Credit Report
Stored Password Hint Answers
Biometrics Scanned Image
Calling Card Number
Salary Info—Other Paycheck Data
Salary Info—Other Employment Data
Salary Info—Other Personal Data
Customer Call Detail—Originating Call #
Customer Call Detail—Terminating Call #
Customer Call Detail—Date of Call
Customer Call Detail—Time of Call
Customer Call Detail—Duration of Call
Other Contacts & ID Codes
Unpublished Service Addresses
Unpublished Phone Numbers Discreetly Identifiable and Associated with Owner
Unpublished Phone Numbers NOT Discreetly Identifiable or Cannot be readily Associated with Owner
Customer Bill Dollar Amount Components
Customer Internet Usage—Originating IP Address
Customer Internet Usage—Calling Station ID
Customer Internet Usage—Date
Customer Internet Usage—User Name
Customer Internet Usage—E-mail Address
Customer Internet Usage—Connecting Pword
IP Assignment Info for websites accessed
Protected Health Info (PHI)
Personnel File Info-other than any highly sensitive data elements noted herein
Bargaining Info (includes proposal, cost data, and rational data elements)
Management Discipline Info (when it can be associated with an individual employee)
401K Account Balances
Pension Account Balances
Deferred Compensation Plan Balances
EEOC Charge Activity
EEO Case Info
Ethics Case Info Security—Subpoena Info Security Case Info (Case Title and Subject, Case Details, Case Notes, & attachments)

Claims Diary Notes

Pending Patent Info—BellSouth Reference #

Pending Patent Info—Serial Number

Pending Patent Info—Disclosure Title

Legal Info—any Info subject to attorney client privilege or work product doctrine Legal Info—any Info received or shared pursuit to a protective order M&A/Strategy/R&D Info Marketing list—e-mail addresses Internal Audit Info—Restricted Distributions Only Network Vulnerability and Configuration Info—Restricted Distributions Only Other Data Specified per Contractual Commitments Other The field labeled "Social Security Number (SSN)" and "SSN—Any partial portion may have help screen right mouse button click functionality. Help screen verbiage may state "Include SSN regardless of data element label. For example, Taxpayer ID is SSN for non-incorporated entities."

The field labeled "Personnel Information" may have help screen right mouse functionality. Help screen verbiage may state "Information stored in electronic personnel file information sources that contain highly sensitive information in addition to highly sensitive data elements listed individually herein. It would be several bits of information that if disclosed together would create highly sensitive information."

The fields labeled "Personal Bank Account Number" and "Personal Credit Card Number" may have help screen right mouse button click functionality. Help screen verbiage may state "Personal includes BellSouth travel or p-card account number, other personal employee account number, or personal account number."

The fields labeled "Corporate Bank Account Number" and "Corporate Credit Card Number" may have help screen right mouse button click functionality. Help screen verbiage may state "Corporate includes BellSouth Corporate, BellSouth vendor, agent, or contractor, or BellSouth customer business account number."

For "Data Specified per Contractual Commitments" selection, some embodiments may provide a required 50 character text box to be completed only if option is selected.

For "Other" selection, some embodiments may provide a required 50 character text box to be completed only if option is selected.

"Data Specified per Contractual Commitments" may have help screen right mouse button click functionality. Help screen verbiage may display "Include all data elements which have safeguards requiring a level of protection above current BellSouth Security Standard requirements. These safe guards should be identified in current binding legal agreement."

Note: Whenever options are listed, include capability for tool administrator to add additional options.

11. For each item selected above, there may be a drop down box labeled "Estimated Number of Occurrences".

There may be a text box that states: "Please enter the number of occurrences within your information source for this highly sensitive data element. This number can be a rough estimate and is not intended to be exact."

For each highly sensitive data element selected, the corresponding detail screen may be viewed. When the highly sensitive data element has not been selected, the screen may be skipped. The content of each window can be exactly the same, except for the header label.

Some embodiments may provide a header label for each of the following:

Social Security Number (SSN)

SSN—Any partial portion

CUID

Driver's License Number

State Issued ID Card Number

Personal Bank Account Number

Corporate Bank Account Number

Positive Pay Information—Check #/Payee/Amount collectively

Bank Routing # with bank account #

Corporate Credit Card Number

Personal Credit Card Number

Debit Card Number

Account Passwords or PINs

Consumer Credit Report

Stored Password Hint Answers

Biometrics Scanned Image

Calling Card Number

Salary Info—Other Paycheck Data

Salary Info—Other Employment Data

Salary Info—Other Personal Data

Customer Call Detail—Originating Call #

Customer Call Detail—Terminating Call #

Customer Call Detail—Date of Call

Customer Call Detail—Time of Call

Customer Call Detail—Duration of Call

Other Contacts & ID Codes

Unpublished Service Addresses

Unpublished Phone Numbers Discreetly Identifiable and Associated with Owner

Unpublished Phone Numbers NOT Discreetly Identifiable or Cannot be readily Associated with Owner Customer Bill Dollar Amount Components Customer Internet Usage—Originating IP Address Customer Internet Usage—Calling Station ID Customer Internet Usage—Date Customer Internet Usage—User Name Customer Internet Usage—E-mail Address Customer Internet Usage—Connecting Pword IP Assignment Info for websites accessed Protected Health Info (PHI)

Personnel File Info-other than any highly sensitive data elements noted herein

Bargaining Info (includes proposal, cost data, and rational data elements)

Management Discipline Info (when it can be associated with an individual employee)

401K Account Balances

Pension Account Balances

Deferred Compensation Plan Balances

EEOC Charge Activity

EEO Case Info

Ethics Case Info

Security—Subpoena Info

Security Case Info (Case Title and Subject, Case Details, Case Notes, & attachments)

Claims Diary Notes

Pending Patent Info—BellSouth Reference #

Pending Patent Info—Serial Number

Pending Patent Info—Disclosure Title

Legal Info—any Info subject to attorney client privilege or work product doctrine Legal Info—any Info received or shared pursuit to a protective order M&A/Strategy/R&D Info Marketing list—e-mail addresses
Internal Audit Info—Restricted Distributions Only
Network Vulnerability and Configuration Info—Restricted Distributions Only
Other Data Specified per Contractual Commitments
Other The field labeled "Social Security Number (SSN)" and "SSN—Any partial portion may have help screen right mouse button click functionality. Help screen verbiage may state "Include SSN regardless of data element label. For example, Taxpayer ID is SSN for non-incorporated entities."

The field labeled "Personnel Information" may have help screen right mouse functionality. Help screen verbiage may state "Information stored in electronic personnel file information sources that contain highly sensitive information in addition to highly sensitive data elements listed individually herein. It would be several bits of information that if disclosed together would create highly sensitive information."

The fields labeled "Personal Bank Account Number" and "Personal Credit Card Number" may have help screen right mouse button click functionality. Help screen verbiage may state "Personal includes BellSouth travel or p-card account number, other personal employee account number, or personal account number."

The fields labeled "Corporate Bank Account Number" and "Corporate Credit Card Number" may have help screen right mouse button click functionality. Help screen verbiage may state "Corporate includes BellSouth Corporate, BellSouth vendor, agent, or contractor, or BellSouth customer business account number."

12. Some embodiments may provide an option box with selection capabilities of the following for each highly sensitive data element selected above:

Encryption of data storage on-site
Data stored in non-clear text in proprietary format—on site
Encryption of data storage off-site—BellSouth premises
Data stored in non-clear text in proprietary format stored off-site—BellSouth premises
Encryption of data storage off-site—Vendor manages storage only
Data stored in non-clear text in proprietary format stored off-site—Vendor manages storage only
Encryption of data storage off-site—Vendor-managed database/information source
Data stored in non-clear text in proprietary format stored off-site—Vendor-managed database/information source
Encryption of data transactions during update process (excluding electronic transmissions to other sites)
Encryption of file transmitted via internet
Non-clear text in proprietary format transmitted via internet
Encryption of file transmitted via intranet
Non-clear text in proprietary format transmitted via intranet
Encryption of file transmission over private line
Non-clear text in proprietary format transmission over private line
Clear-Text file transmission over private line
Encryption of physical transfer of electronic data (e.g. CD mailed to vendor)
Electronic data never physically transferred
Data never transmitted electronically
Complete suppression of data field/information
Partial suppression of data field/information
Scanning tool utilized for outbound e-mails
Other controls at the data field level For "Other controls at the data field level" selection, some embodiments may provide a required 50 character text box to be completed only if option is selected.

12a. Note: For each positive selection for encryption, some embodiments may provide a required 50-character text box appear that is labeled "Encryption Tool Name".

Some embodiments may provide a screen label "Use and Location".

13. Some embodiments may provide field label "Job Functions of Information Source Users".

Some embodiments may provide a 100 character text field to list job functions.

"Job Function Descriptions of Information Source Users" may have help screen right mouse button click functionality. Help screen verbiage may state "List description of job function that uses this information source. Examples include "Network Technicians" or "Sales Associates".

14. Some embodiments may provide a field label "Physical Location".

Some embodiments may provide an option box with the following options:

BellSouth Data Center
Locally Managed—Resource Room
Locally Managed—Non-Resource Room
Individual User Desktop
Corporate Shared Drive (including personal network directory on corporate drive)
Departmental Shared Drive (including personal network directory on departmental drive)
SharePoint Site
Off-site Vendor Location
Removable storage device
Other For "Other" selection, some embodiments may provide a required 50 character text box to be completed only if option is selected.

15. Some embodiments may provide a field label "Information Source Developer".

Some embodiments may provide an option box with the following options:

Accenture
Actema
Amdocs
BellSouth Science & Technology
BellSouth Science & Technology Staff Augmentation contractors
BellSouth Technology Group (BTG)
BellSouth Technology Group (BTG) Staff Augmentation contractors
BellSouth—Other
CGI—AMS (Cap Gemini—American Management Systems
EDS
Telcordia
Other For "BellSouth Other" selection, some embodiments may provide a required 50 character text box to be completed only if option is selected.

For "Other" selection, some embodiments may provide a required 50 character text box to be completed only if option is selected.

Some embodiments may provide a screen label "Safeguards at the Information Source Level".

Some embodiments may provide a field label. "Various security safeguards can be implemented to protect data. Please select any of the following safeguards that are currently in place for the information source. Not all safeguards are applicable to all information sources."

16. Some embodiments may provide an option box with the following selections:

Access Safeguard—Unique Logon ID/Password

Access Safeguard—2-factor Authentication (other than remote access)

Access Safeguard—Role Based Access

Access Safeguard—Logging of Access at the application level

Access Safeguard—Logging of Access at the database level

Access Safeguard—Logging of Access at the operating system level

Access Safeguard—Password File Encryption

Network Segregation

Network Intrusion Detection System

Internal Host Based Security Vulnerability Scanning

External Network Based Security Vulnerability Scanning

Restricted Database Views

Other Key Security Safeguard (1)

Other Key Security Safeguard (2)

Other Key Security Safeguard (3)

For Off-Site-Vendor Managed Information Sources:

SAS 70 performed within last 12 months

Other IT security audit or formal security review performed within last two years For all "Other" selections, some embodiments may provide a required 50 character text box to be completed only if option is selected.

Access Safeguard—2-factor Authentication may have help screen right mouse bottom click functionality. Help screen verbiage may state "2 factor authentication is any authentication protocol that requires two independent ways to establish identity and privileges. It is authentication based on something you know (password) plus something you have (token or certificate) or something you are (biometric finger print). 2 factor authentication is also referred to as "Strong Authentication."

Access Safeguard—Role Based Access may have help screen right mouse button click functionality. Help screen verbiage may state "Individual access is grouped into "roles" based on business need."

Note: Whenever options are listed, include capability for tool administrator to add additional options.

Some embodiments may provide a screen label "Status of Information Source Transmission Activity".

Some embodiments may provide a field label. "Please select the option that best describes the transmission activity of the Information Source where BellSouth initiates transmission (e.g. from BellSouth, not to BellSouth)."

17. Some embodiments may provide an option box with the following selections:

Transmitted internally, including physical transfer of storage media

Transmitted externally, including physical transfer of storage media (e.g. CD mailed to vendor)

Transmitted both internally and externally

Information source is never transmitted internally or externally

Note: For each selection where externally is included, three required 50-character text boxes may appear. The first one should be labeled "Company Transmitted to:" The second one should be labeled "Frequency of Transmission". The third one may be labeled "Method of External Transmission—Brief Description".

18. Some embodiments may provide a screen label "Contact Information"

Some embodiments may provide a text box stating "For all contact information, complete either the UID or phone number, e-mail and ipage address fields."

18a. Some embodiments may provide a header label "Executive Information Source Owner Information".

Some embodiments may provide a field label "Executive Information Source Owner Name".

Some embodiments may provide a field label "Executive Information Source Owner Title".

Some embodiments may provide a field label "UID or the following contact information (UID preferred)

Some embodiments may provide a field label "UID"

Some embodiments may provide a field label "or"

Some embodiments may provide a field label "Information Source Owner Phone Number".

Some embodiments may provide a field label "Information Source Owner E-mail".

Some embodiments may provide a field label "Information Source Owner iPage address".

Some embodiments may provide a field label "Business Unit" with drop down box selection as follows:

19. Some embodiments may provide an option box with the following selections:

Advertising and Public Relations

Advertising and Publishing

BellSouth Business

Consumer

Corporate Aviation

Corporate Compliance & Corporate Secretary

Diversity

Finance

Human Resources

Intellectual Property

Distance

Network Services

Planning & Development

Product Development and Marketing

Regulatory and External Affairs

Small Business

Technology Group

Other

"Information Source Owner Information" may have help screen right mouse button click functionality. Help screen verbiage may state "Enter the information for the individual primarily accountable for this data (should be Senior Director or above). This is the person who determines the information's value, oversees implementation of appropriate security safeguards, and certifies accuracy and completeness of data sensitivity classifications."

18b. Some embodiments may provide a header label "Information Source Owner Contact Information".

Some embodiments may provide a field label "Information Source Owner Contact Name".

Some embodiments may provide a field label "Information Source Owner Contact Title".

Some embodiments may provide a field label "UID or the following contact information (UID preferred).

Some embodiments may provide a field label "UID".

Some embodiments may provide a field label "or".

Some embodiments may provide a field label "Information Source Owner Contact Phone Number".

Some embodiments may provide a field label "Information Source Owner Contact E-mail".

Some embodiments may provide a field label "Information Source Owner Contact iPage address".

"Information Source Owner Contact Information" may have help screen right mouse button click functionality. Help screen verbiage may state "Primary point of contact for the Information Source Owner."

18c. Some embodiments may provide a header label "Primary Data Custodian Information".

Some embodiments may provide a field label "Primary Data Custodian Name".

Some embodiments may provide a field label "Primary Data Custodian Title".

Some embodiments may provide a field label "UID or the following contact information (UID preferred).

Some embodiments may provide a field label "UID".

Some embodiments may provide a field label "or".

Some embodiments may provide a field label "Primary Data Custodian Phone Number".

Some embodiments may provide a field label "Primary Data Custodian E-mail".

Some embodiments may provide a field label "Primary Data Custodian iPage address".

18d. Some embodiments may provide a field label "CIO SME Contact Information".

Some embodiments may provide a field label "CIO SME Name".

Some embodiments may provide a field label "CIO SME Title".

Some embodiments may provide a field label "UID or the following contact information (UID preferred).

Some embodiments may provide a field label "UID".

Some embodiments may provide a field label "or".

Some embodiments may provide a field label "CIO SME Phone Number".

Some embodiments may provide a field label "CIO SME E-mail".

Some embodiments may provide a field label "CIO SME iPage address".

"CIO SME Contact Information" may have help screen right mouse button click functionality. Help screen verbiage may state "single point of contact for the information source within a CIO's responsibility. Note: This point of contact may not be applicable in all cases."

18e. Some embodiments may provide a field label "Developer Contact Information".

Some embodiments may provide a field label "Developer Name".

Some embodiments may provide a field label "Developer Title".

Some embodiments may provide a field label "UID or the following contact information (UID preferred).

Some embodiments may provide a field label "UID".

Some embodiments may provide a field label "or".

Some embodiments may provide a field label "Developer Phone Number".

Some embodiments may provide a field label "Developer E-mail".

Some embodiments may provide a field label "Developer iPage address".

"Developer Contact Information" may have help screen right mouse button click functionality. Help screen verbiage may state "single point of contact for the developer of the information source."

Some embodiments may provide an Internet-facing value to Information sources. A yes response may require a URL to be populated.

Some embodiments may provide comments that allow additional information to be added by users that may not fit into any solution.

Some embodiments may provide a Solution Implemented field that shows whether recommendations are accepted or risks are accepted and requires an explanation if risks are accepted.

Some embodiments may provide a Recommendation field which is the recommendation by the DSC team.

Some embodiments may provide a Wave Assignment which is the field that identifies when this information source will be addressed.

Some embodiments may provide a DSC Inventory Scope Status which is an internal field that indicates if the information source is in scope or out of scope. Out of scope items are not included in risk rating.

Some embodiments may provide Internal Comments that are internally visible to the DSC team only.

Accordingly, some embodiments of the invention can provide a user-friendly, comprehensive, centralized source for managing sensitive information sources and their controls and can include one or more of the following functionalities:

- Role-based access that allows user views and edits based on ownership, creation, business unit, and manually assigned roles.
- Task-based entry system for creating new information sources with allowances for system administrators to create new options.
- Reports that show encryption of data elements and allow exporting of information sources based on provided criteria.
- Dynamic Risk Rating Models (FIG. 5NN) that allow administrators to define the settings for their reports and produce comparative risk ratings across all corporate applications.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An enterprise confidential electronic data inventory system comprising:

a database management system that executes on a programmed computer processor, the database management system configured to:

store identifying information for the confidential electronic data of the enterprise without storing the confidential electronic data, wherein the identifying information for the confidential electronic data of the enterprise comprises an identification of an electronic location of the confidential electronic data, an identification of a data type of the confidential electronic data, an indication of a quantity of the confidential electronic data, and an indication of a system type for the electronic location of the confidential electronic data, and wherein the electronic location is a network address of a system that stores the confidential electronic data, and wherein the system type relates to a type of computer system on which the confidential electronic data is stored; and query the identifying information for the confidential electronic data of the enterprise that is stored, wherein querying the identifying information includes querying the identification of an electronic location of the confidential electronic data, the identification of a data type of the confidential electronic data, and/or the indication of a quantity of the confidential electronic data.

2. A system according to claim 1 wherein the identifying information for the confidential electronic data of the enterprise further comprises an identification of a contact person for the confidential electronic data.

3. A system according to claim 1 wherein the identifying information for the confidential electronic data of the enterprise further comprises an indication of safeguards that are in place for the confidential electronic data.

4. A system according to claim 1 wherein the identifying information for the confidential electronic data of the enterprise further comprises an indication of a confidentiality classification level of the confidential electronic data.

5. A system according to claim 1 wherein the confidential electronic data comprises identity theft enabling data, enterprise employee data, enterprise customer data, enterprise strategic data and enterprise legal data.

6. A system according to claim 1 further comprising:

an enterprise network that is connected to the database management system; and a plurality of enterprise client devices connected to the enterprise network;

wherein the enterprise client devices are configured to accept input of the identifying information for the confidential electronic data of the enterprise without accepting input of the confidential electronic data and to transmit the identifying information for the confidential electronic data of the enterprise to the database management system via the enterprise network, and/or to accept queries of the database management system, to transmit the queries to the database management system via the enterprise network and to receive query results from the database management system via the enterprise network.

7. A system according to claim 1 further comprising:

an enterprise network that is connected to the database management system;

wherein the database management system is configured to store identifying information for the confidential electronic data of the enterprise that is received from the enterprise network without storing the confidential electronic data, to receive queries of the database management system from the enterprise network and to transmit query results from the database management system via the enterprise network.

8. An enterprise confidential electronic data inventory computer program product, the computer program product comprising a computer usable storage medium having computer-readable program code embodied in the medium, the computer-readable program code comprising:

computer-readable program code configured to provide a database management system that is configured to:

store identifying information for the confidential electronic data of the enterprise without storing the confidential electronic data, wherein the identifying information for the confidential electronic data of the enterprise comprises an identification of an electronic location of the confidential electronic data, an identification of a data type of the confidential electronic data, and an indication of a quantity of the confidential electronic data, and an indication of a system type for the electronic location of the confidential electronic data, and wherein the electronic location is a network address of a system that stores the confidential electronic data, and wherein the system type relates to a type of computer system on which the confidential electronic data is stored; and query the identifying information for the confidential electronic data of the enterprise that is stored, wherein querying the identifying information includes querying the identification of an electronic location of the confidential electronic data, the identification of a data type of the confidential electronic data, and/or the indication of a quantity of the confidential electronic data.

9. A computer program product according to claim 8 wherein the identifying information for the confidential electronic data of the enterprise further comprises an identification of a contact person for the confidential electronic data.

10. A computer program product according to claim 8 wherein the identifying information for the confidential electronic data of the enterprise further comprises an indication of safeguards that are in place for the confidential electronic data.

11. A computer program product according to claim 8 wherein the identifying information for the confidential electronic data of the enterprise further comprises an indication of a confidentiality classification level of the confidential electronic data.

12. A computer program product according to claim 8 wherein the confidential electronic data comprises identity theft enabling data, enterprise employee data, enterprise customer data, enterprise strategic data and enterprise legal data.

13. An enterprise confidential electronic data inventory method comprising:

operating a database using a programmed computer processor; and storing identifying information for the confidential electronic data of the enterprise in the database without storing the confidential electronic data in the database, wherein the identifying information for the confidential electronic data of the enterprise comprises an identification of an electronic location of the confidential electronic data, an identification of a data type of the confidential electronic data, an indication of a quantity of the confidential electronic data, and an indication of a system type for the electronic location of the confidential electronic data, and wherein the electronic location is a network address of a system that stores the confidential electronic data, and wherein the system type relates to a type of computer system on which the confidential electronic data is stored; and providing querying of the identifying information for the confidential electronic data of the enterprise that is stored, wherein providing querying of the identifying information includes providing querying of the identification of an electronic location of the confidential electronic data, the identification of a data type of the confidential electronic data, and/or the indication of a quantity of the confidential electronic data.

14. A method according to claim 13 further comprising:

querying the identifying information for the confidential electronic data of the enterprise that is stored in the database.

* * * * *